(12) United States Patent
Yamashita et al.

(10) Patent No.: US 10,916,751 B2
(45) Date of Patent: Feb. 9, 2021

(54) POWER STORAGE APPARATUS

(71) Applicant: KABUSHIKI KAISHA TOYOTA JIDOSHOKKI, Kariya (JP)

(72) Inventors: Yusuke Yamashita, Kariya (JP); Takayuki Hirose, Kariya (JP); Shinji Suzuki, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 16/488,346

(22) PCT Filed: Feb. 27, 2018

(86) PCT No.: PCT/JP2018/007287
§ 371 (c)(1),
(2) Date: Aug. 23, 2019

(87) PCT Pub. No.: WO2018/159618
PCT Pub. Date: Sep. 7, 2018

(65) Prior Publication Data
US 2020/0381687 A1   Dec. 3, 2020

(30) Foreign Application Priority Data
Feb. 28, 2017   (JP) ................. 2017-036915

(51) Int. Cl.
*H01M 2/12*   (2006.01)
*H01M 2/34*   (2006.01)
*H01M 2/26*   (2006.01)

(52) U.S. Cl.
CPC .......... *H01M 2/1252* (2013.01); *H01M 2/26* (2013.01); *H01M 2/34* (2013.01)

(58) Field of Classification Search
None
See application file for complete search history.

(56) References Cited

U.S. PATENT DOCUMENTS

| | | |
|---|---|---|
| 2012/0088128 A1 | 4/2012 | Matsuura et al. |
| 2015/0318526 A1 | 11/2015 | Mune et al. |
| 2017/0271630 A1 | 9/2017 | Guo et al. |

FOREIGN PATENT DOCUMENTS

| | | |
|---|---|---|
| CN | 105591062 A | 5/2016 |
| JP | 10-340712 A | 12/1998 |
| JP | 2002-289155 A | 10/2002 |
| JP | 4881409 B2 | 2/2012 |
| JP | 2014-130801 A | 7/2014 |
| JP | 2015-076293 A | 4/2015 |
| JP | 2016-139586 A | 8/2016 |

OTHER PUBLICATIONS

International Search Report for PCT/JP2018/007287 dated Apr. 24, 2018 [PCT/ISA/210].

*Primary Examiner* — Sarah A. Slifka
(74) *Attorney, Agent, or Firm* — Sughrue Mion, PLLC

(57) ABSTRACT

A power storage apparatus is configured such that a region surrounded by a plane connecting the outline of a pressure release valve and the outline of a tab-side end face in an electrode assembly in the shortest distance is defined as a three-dimensional region. The power storage apparatus is provided with a covering portion that covers the entire cross section of the three-dimensional region along the tab-side end face in a space between the tab-side end face and the inner surface of a lid body.

26 Claims, 16 Drawing Sheets

Fig.18A
Fig.18B
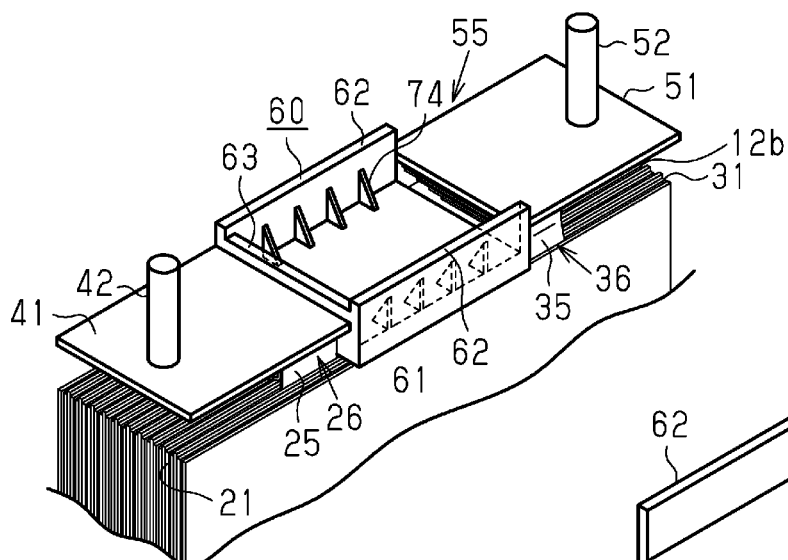
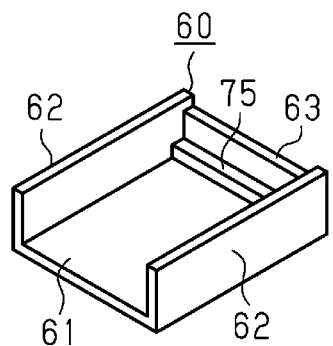
Fig.19
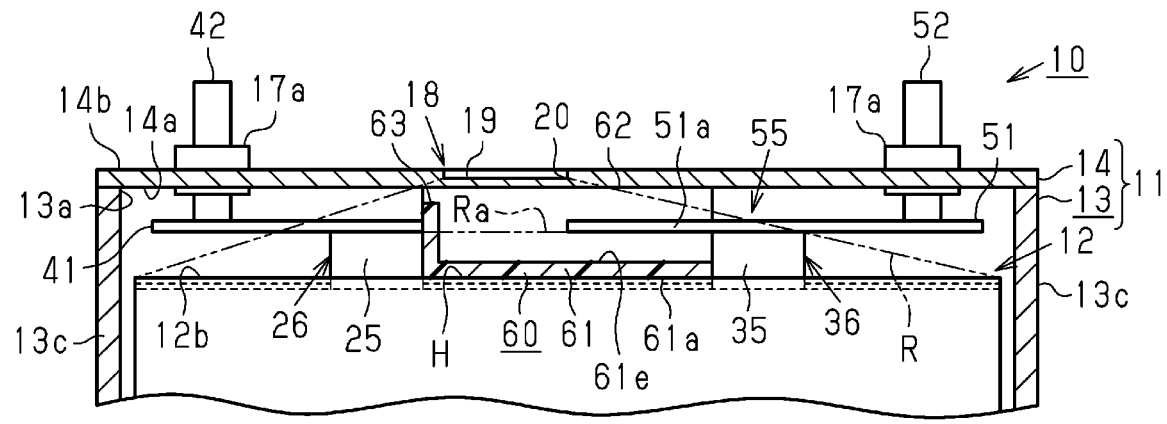

POWER STORAGE APPARATUS

CROSS REFERENCE TO RELATED APPLICATIONS

This application is a National Stage of International Application No. PCT/JP2018/007287 filed Feb. 27, 2018, claiming priority based on Japanese Patent Application No. 2017-036915 filed Feb. 28, 2017.

TECHNICAL FIELD

The present invention relates to a power storage apparatus including a pressure release valve.

BACKGROUND ART

Electric vehicles (EVs) and plug-in hybrid vehicles (PHVs) are equipped with rechargeable batteries, such as lithium-ion batteries, as power storage apparatuses for storing power supplied to motors, which serve as drive sources. For example, Patent Document 1 describes a rechargeable battery that includes an electrode assembly and liquid electrolyte contained in a case. The case has a wall portion including a pressure release valve for releasing the pressure out of the case.

PRIOR ART DOCUMENT

Patent Document
Patent Document 1: Japanese Patent No. 4881409

SUMMARY OF THE INVENTION

Problems that the Invention is to Solve

When such a rechargeable battery is subjected to a nail penetration test, which is one of the evaluation tests for rechargeable batteries, a nail breaks the separators between the positive electrodes and the negative electrodes, creating a short circuit between the positive and negative electrodes in the case. The short circuit generates heat around it, and this heat decomposes the liquid electrolyte components and thus generates gas in the case. The gas increases the pressure in the case, causing the pressure release valve to tear. The high-pressure gas being released out of the case through the pressure release valve may scrape off and carry fragments of the electrodes and scatter these fragments out of the case.

It is an objective of the present invention to provide a power storage apparatus that reduces segments of electrodes flying out through a torn pressure release valve in a nail penetration test.

Means for Solving the Problems

To achieve the foregoing objective, a power storage apparatus is provided that includes an electrode assembly in which a positive electrode and a negative electrode are insulated from each other and have a lamination structure, a positive electrode conductive member connected to a tab of the positive electrode, a negative electrode conductive member connected to a tab of the negative electrode, liquid electrolyte, a case containing the electrode assembly and the liquid electrolyte, and a pressure release valve that is located in a wall portion of the case and configured to tear when a pressure in the case reaches a release pressure to release the pressure out of the case. The positive electrode conductive member and the negative electrode conductive member are arranged in a longitudinal direction of the wall portion. The case has a parallelepiped shape. The electrode assembly has a lamination direction in which the positive electrode and the negative electrode are stacked, the lamination direction is identical with a transverse direction of the wall portion. The positive electrode conductive member and the negative electrode conductive member have dimensions in the transverse direction of the wall portion that are less than an opening width of a main body of the case in the transverse direction. A region surrounded by planes connecting an outline of an end face of the electrode assembly that faces an inner surface of the wall portion of the case to an outline of the pressure release valve in shortest distances is defined as a three-dimensional region. The power storage apparatus further comprises a covering portion that is located in a space between the end face of the electrode assembly and the inner surface of the wall portion, the covering portion covering a cross section of the three-dimensional region that extends along the end face of the electrode assembly over an entire length in the longitudinal direction of the cross section. The positive electrode conductive member, the negative electrode conductive member, and a shield, which is placed between the positive and negative electrode conductive members, form the covering portion.

With this configuration, in a nail penetration test, the nail inserted in the center of the case in a front view causes a short circuit between the electrodes of different polarities in the case. The short circuit generates heat around it, and this heat decomposes the liquid electrolyte components and thus generates gas. The generated gas increases the pressure in the power storage apparatus. When the internal pressure of the case reaches the release pressure of the pressure release valve, the pressure release valve tears and releases the pressure out of the case.

High-pressure gas generated at the short circuit moves from the end face of the electrode assembly toward the torn pressure release valve through the three-dimensional region. At this time, the force of generated gas scrapes off fragments of electrodes. The positive electrode conductive member, the negative electrode conductive member, and the shield are located between the torn pressure release valve and the cross section of the three-dimensional region, and cover the cross section over its entire length in the longitudinal direction of the wall portion. Thus, gas emerging from the electrode assembly collides against the positive electrode conductive member, the negative electrode conductive member, and the shield. This changes the direction of the gas moving toward the pressure release valve, creating longer gas discharge paths to the pressure release valve. Gas flowing in the transverse direction of the wall portion flows over the surfaces of the positive and negative electrode conductive members and moves toward the pressure release valve. This also creates longer gas discharge paths to the pressure release valve. As a result, fragments of electrodes contained in the gas may fall from the gas, reducing the fragments of electrodes flying out of the case through the torn pressure release valve.

To achieve the foregoing objective, a power storage apparatus is provided that includes an electrode assembly in which electrodes with different polarities are insulated from each other and have a lamination structure, liquid electrolyte, a case containing the electrode assembly and the liquid electrolyte, and a pressure release valve that is located in a wall portion of the case and configured to tear when a pressure in the case reaches a release pressure to release the pressure out of the case. The case has a parallelepiped shape.

The electrode assembly has a lamination direction in which the electrodes are stacked, the lamination direction being identical with a transverse direction of the wall portion. A region surrounded by planes connecting an outline of an end face of the electrode assembly that faces an inner surface of the wall portion of the case to an outline of the pressure release valve in shortest distances is defined as a three-dimensional region. The power storage apparatus further comprises a covering portion that is located in a space between the end face of the electrode assembly and the inner surface of the wall portion. The covering portion covers an entire cross section of the three-dimensional region that extends along the end face of the electrode assembly.

With this configuration, in a nail penetration test, the nail inserted in the center of the case in a front view causes a short circuit between the electrodes of different polarities in the case. The short circuit generates heat around it, and the heat decomposes the liquid electrolyte components and thus generates gas. The generated gas increases the pressure in the power storage apparatus. When the internal pressure of the case reaches the release pressure of the pressure release valve, the pressure release valve tears and releases the pressure out of the case.

High-pressure gas generated at the short circuit moves from the end face of the electrode assembly toward the torn pressure release valve through the three-dimensional region. At this time, the force of generated gas scrapes off fragments of electrodes. The covering portion is located between the torn pressure release valve and the cross section of the three-dimensional region, and covers the entire cross section. Thus, gas emerging from the electrode assembly collides against the covering portion. This changes the direction of the gas moving toward the pressure release valve, creating longer gas discharge paths to the pressure release valve. As a result, fragments of the electrodes contained in the gas may fall from the gas, reducing the fragments of electrodes flying out of the case through the torn pressure release valve.

In the the power storage apparatus, the electrodes of different polarities may be a positive electrode and a negative electrode, the positive electrode and the negative electrode each may have a tab. The tab of the positive electrode may project from the end face of the electrode assembly. The power storage apparatus further may include a positive electrode conductive member connected to the tab of the positive electrode, and a negative electrode conductive member connected to the tab of the negative electrode. The positive electrode conductive member and the negative electrode conductive member may be arranged in a longitudinal direction of the wall portion. The positive electrode conductive member, the negative electrode conductive member, and a shield, which is placed between the positive and negative electrode conductive members, may form the covering portion.

This configuration forms the covering portion by using the conductive members of different polarities, which are existing components of the power storage apparatus, and by adding the shield.

In the power storage apparatus, the shield includes a shielding portion placed along the end face of the electrode assembly, and a spacing portion configured to be in contact with a section of the inner surface of the wall portion around the pressure release valve such that the shielding portion is spaced apart from the wall portion.

With this configuration, when the gas pressure generated in the case acts on the shielding portion, the spacing portion is brought into contact with the wall portion, maintaining a state in which the shielding portion is spaced apart from the wall portion. This secures the flow path of gas toward the pressure release valve in the configuration in which the shield is placed between the electrode assembly and the wall portion, maintaining the function of discharging gas out of the case through the pressure release valve.

In the power storage apparatus, the spacing portion may include a plurality of spacing rods projecting from the shielding portion.

The configuration secures a flow path of gas between adjacent spacing rods, maintaining the function of discharging gas out of the case through the pressure release valve.

In the power storage apparatus, the spacing portion may be a rib that projects from the shielding portion toward the wall portion and have a surface intersecting with a gas path extending along a surface direction of the shielding portion.

With this configuration, the gas emerging out of the electrode assembly through the end face of the electrode assembly may flow along the rib, creating longer gas discharge paths. This allows fragments of the electrodes contained in the gas to fall from the gas, reducing the fragments of electrodes flying out of the case through the torn pressure release valve.

In the power storage apparatus, the rib may be one of ribs projecting from a pair of edges of the shielding portion extending in the longitudinal direction of the wall portion.

With this configuration, in a nail penetration test, the electrode assembly expands in the lamination direction, and gas flows in the lamination direction of the electrode assembly toward the pressure release valve. This gas may collide against the rib, allowing fragments of electrodes contained in the gas to fall from the gas.

In the power storage apparatus, the shield may further include a rib projecting toward the wall portion from an edge of the shielding portion extending in the transverse direction of the wall portion.

With this configuration, gas flowing toward the pressure release valve from the direction perpendicular to the lamination direction of the electrode assembly may collide against the rib, allowing fragments of electrodes contained in the gas to fall from the gas. This reduces the fragments of electrodes flying out of the case through the torn pressure release valve.

In the power storage apparatus, the rib extending in the transverse direction of the wall portion may include a gas passage hole.

With this configuration, when gas collides against the rib, fragments of electrodes contained in the gas may fall. On the other hand, the gas passes through the gas passage hole and are released out of the case through the torn pressure release valve. That is, the gas passage hole functions to filter out fragments of electrodes, which would cause sparks. This reduces the fragments of electrodes flying out of the case together with the gas and becoming sparks.

The power storage apparatus may further include a reinforcing rib connected to the shielding portion and the rib.

This configuration reinforces the shielding portion and the rib with the reinforcing rib, limiting deformation of the shield, which would otherwise occur due to the collision of gas.

In the power storage apparatus, when the shield is viewed from a side corresponding to the electrode assembly toward the inner surface of the wall portion, the rib is within a plane defined by an outline of the shielding portion.

With this configuration, the shield does not have a flange that projects from the outer surface of the rib to fix the shield to the wall portion. As compared with a configuration that includes a flange for fixing the shield to the wall portion, this configuration provides a wider space between the end face of the electrode assembly and the wall portion. This limits an increase in the pressure in the case.

In the power storage apparatus, the shield has a tubular shape and a central axis extending in the longitudinal direction of the wall portion. The shield includes a gas inlet, which is located at an opening in one of axial ends of the shield, and a gas outlet, which is located in the other axial end and opens toward the pressure release valve. The shield includes a path changing wall located in a gas path extending from the gas inlet to the gas outlet.

With this configuration, gas collides against the shielding portion and thus changes the direction. The gas then flows into the shield through the gas inlet. In the path of the gas flowing from the gas inlet to the gas outlet, the path changing wall changes the direction of the flowing gas, causing the gas to collide against the wall of the shield. The gas then flows out of the shield through the gas outlet and is released out of the case through the pressure release valve.

The path changing wall of the shield increases the number of times the gas collides against the shield. This allows fragments of electrodes contained in the gas to fall from the gas, reducing the fragments of electrodes flying out of the case together with the gas and becoming sparks.

In the power storage apparatus, the rib of the shield extending in the transverse direction of the wall portion is located between the pressure release valve and the positive electrode conductive member. A path of gas moving from a side corresponding to the positive electrode conductive member toward the pressure release valve along the longitudinal direction and the surface direction of the wall portion is defined as a positive electrode-side gas discharge path. A path of gas moving from a side corresponding to the negative electrode conductive member toward the pressure release valve along the longitudinal direction and the surface direction of the wall portion is defined as a negative electrode-side gas discharge path. A flow passage resistance on the gas in the positive electrode-side gas discharge path is greater than a flow passage resistance on the gas in the negative electrode-side gas discharge path.

With this configuration, in a nail penetration test, when gas passes through between the positive electrode tabs and collides against the positive electrode conductive member, the high-temperature, high-pressure gas melts or scrapes off fragments of the tabs of the positive electrodes and/or the positive electrode conductive member, so that the gas contains these fragments. However, this gas may collide against the rib, reducing the fragments of the tabs or the positive electrode conductive member that are discharged out of the case. Since the positive electrode-side gas discharge path has a greater flow passage resistance, gas tends to move toward the negative electrode conductive member and flow in the negative electrode-side gas discharge path. This facilitates the flow of gas in the negative electrode-side gas discharge path toward the pressure release valve, limiting an increase in the pressure in the case.

In the power storage apparatus, the positive electrode-side gas discharge path has a smaller flow passage cross-sectional area than the negative electrode-side gas discharge path.

With this configuration, the gas discharge paths, which connect the end face of the electrode assembly to the pressure release valve, are not significantly different from each other in length. Thus, the difference in flow passage cross-sectional area determines the tendency of gas flow. Since the positive electrode-side gas discharge path has a smaller flow passage cross-sectional area than the negative electrode-side gas discharge path, gas tends to flow in the negative electrode-side gas discharge path.

In the power storage apparatus, the rib extending in the transverse direction of the wall portion has a projecting end extending from the shielding portion. The projecting end is closer to the wall portion than the positive electrode conductive member.

With this configuration, in a nail penetration test, when gas passes between the positive electrode tabs and collides against the positive electrode conductive member, the high-temperature, high-pressure gas may melt or scrape off fragments of the positive electrode conductive member. However, this gas may collide against the rib, reducing the fragments that are discharged out of the case.

In the power storage apparatus, the projecting end, which extends from the shielding portion, of the rib extending in the transverse direction of the wall portion is spaced apart from the inner surface of the wall portion.

While the positive electrode-side gas discharge path has a larger flow passage resistance than the negative electrode-side gas discharge path, this configuration still secures the positive electrode-side gas discharge path so as to discharge the gas emerging from the side corresponding to the positive electrode conductive member out of the case through the pressure release valve. This prevents an excessive increase in the pressure in the case.

The power storage apparatus further includes a movement restriction member that is located between the inner surface of the wall portion and the end face of the electrode assembly to restrict movement of the shield in the longitudinal direction of the wall portion.

With this configuration, the movement restriction member maintains the position of the shield and maintains a state in which the shielding portion covers the cross section of the three-dimensional region.

In the power storage apparatus, the movement restriction member that restricts movement of the shield toward the positive electrode conductive member is the positive electrode conductive member. The movement restriction member that restricts movement of the shield toward the negative electrode conductive member is a tab group that is the tabs collected in the lamination direction.

This configuration restricts movement of the shield using the existing members in the case such as the positive electrode conductive member and the negative electrode tab group.

In the power storage apparatus, the movement restriction member that restricts movement of the shield toward the positive electrode conductive member is the positive electrode conductive member. The movement restriction member that restricts movement of the shield toward the negative electrode conductive member is the negative electrode conductive member.

This configuration restricts movement of the shield using the existing members in the case such as the positive electrode conductive member and the negative electrode conductive member.

In the power storage apparatus, the shield includes baffle plates each of which overlaps with a corresponding one of the tabs of different polarities as viewed from a side corresponding to an outer surface of the wall portion and covers the tab along the longitudinal direction of the wall portion.

With this configuration, the gas emerging from between the tabs adjacent to each other in the lamination direction collides against the baffle plates, allowing fragments of electrodes contained in the gas to fall from the gas.

In the power storage apparatus, one of the positive electrode conductive member and the negative electrode conductive member includes an overlapping section that overlaps with the wall portion and the shielding portion as viewed from a side corresponding to an outer surface of the wall portion.

With this configuration, gas generated in a nail penetration test may collide against the shielding portion and change the direction. Then, the gas passes through between the opposing surfaces of the shielding portion and the overlapping section of one of the positive and negative electrode conductive members, and moves toward the pressure release valve. The overlapping section limits contact between the high-temperature gas and the wall portion.

The power storage apparatus further includes a bent section where the overlapping section of the one of the positive and negative electrode conductive members is bent toward the pressure release valve.

With this configuration, gas generated in a nail penetration test may collide against the shielding portion and change the direction. Then, the gas passes through between the opposing surfaces of the shielding portion and the overlapping section of the conductive member, and moves toward the pressure release valve. The bent section allows the overlapping section to point toward the pressure release valve, directing the gas moving along the overlapping section toward the pressure release valve.

In the power storage apparatus, a center position of the pressure release valve in the longitudinal direction of the wall portion is closer to the negative electrode conductive member than a center position between the tab of the positive electrode and the tab of the negative electrode in the longitudinal direction of the wall portion.

With this configuration, in a nail penetration test, when gas passes through between the positive electrode tabs and collides against the positive electrode conductive member, the high-temperature, high-pressure gas may melt or scrape off fragments of the tabs of the positive electrodes and/or the positive electrode conductive member, so that the gas contains these fragments. However, this gas may collide against the wall portion, reducing the fragments of the tabs or the positive electrode conductive member that are discharged out of the case. The pressure release valve is closer to the negative electrode conductive member, and thus the gas discharge path extending from the side corresponding to the positive electrode conductive member to the pressure release valve is longer and therefore has a greater flow passage resistance than the gas discharge path extending from the side corresponding to the negative electrode conductive member to the pressure release valve. Consequently, gas tends to flow toward the negative electrode conductive member.

The power storage apparatus further includes a gap between the tab of the positive electrode and the rib in the longitudinal direction of the wall portion, and a gas collision member that covers the gap from a side corresponding to the wall portion.

With this configuration, gas generated in a nail penetration test flows through the gap between the rib of the shield and the tabs of the positive electrodes. This limits melting of the tabs as compared with a configuration in which gas flows between the tabs of the positive electrodes. After flowing through the gap, the gas collides against the gas collision member. This collision reduces the fragments of the tabs and the positive electrode conductive member that are discharged out of the case.

In the power storage apparatus, the shield is spaced apart from an inner surface of the case.

With this configuration, while allowing fragments of electrodes contained in the gas to fall in the case, the shield does not block the pressure release valve and therefore does not compromise the function of the pressure release valve.

In the power storage apparatus, the shield is placed on the end face of the electrode assembly.

With this configuration, gas emerging from the electrode assembly through the cross section of the three-dimensional region immediately collides against the shielding portion. Thus, the direction of the gas flowing toward the pressure release valve is changed immediately, so that the gas discharge path toward the pressure release valve is changed immediately to be longer.

In the power storage apparatus, the shield is made of metal. This reduces the likelihood that the high-temperature, high-pressure gas generated in a nail penetration test melting the shield.

In the power storage apparatus, the shield has heat resistance. For example, if the shield is made of metal, the shield requires a coating of insulating plastic or ceramic on its surface so as to avoid a short circuit between the case and the electrodes. However, the shield with heat resistance does not require a coating for insulation.

In the power storage apparatus, the shield has a flat inner surface. This configuration allows gas generated in a nail penetration test to easily move in the shield toward the pressure release valve.

In the power storage apparatus, the shield extends from the wall portion. This configuration includes the shield formed in the wall portion. This reduces the fragments of electrodes flying out of the case through the torn pressure release valve, without increasing the number of components of the power storage apparatus.

Effects of the Invention

The present invention reduces fragments of electrodes flying out through the torn pressure release valve in a nail penetration test.

BRIEF DESCRIPTION OF THE DRAWINGS

FIGS. 18A and 18B are perspective views showing shields with reinforcing ribs.

FIG. 19 is a partial cross-sectional view showing a negative electrode conductive member including an overlapping section.

MODES FOR CARRYING OUT THE INVENTION

First Embodiment

A power storage apparatus according to a first embodiment will now be described with reference to FIGS. 1 to 6. The apparatus is applied to a rechargeable battery.

Figure 1:
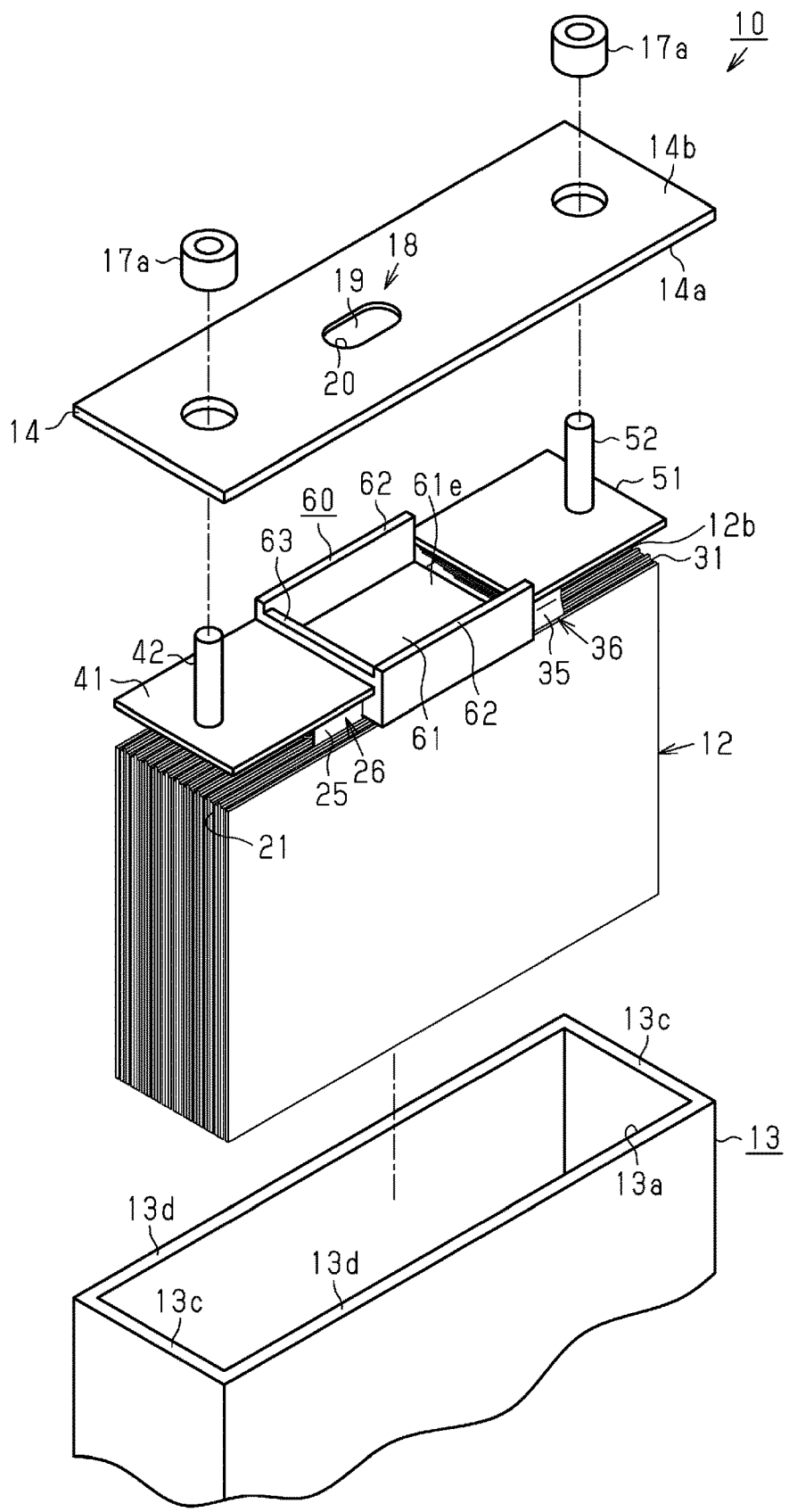
FIG. 1 is an exploded perspective view showing a rechargeable battery according to a first embodiment.
Figure 2:
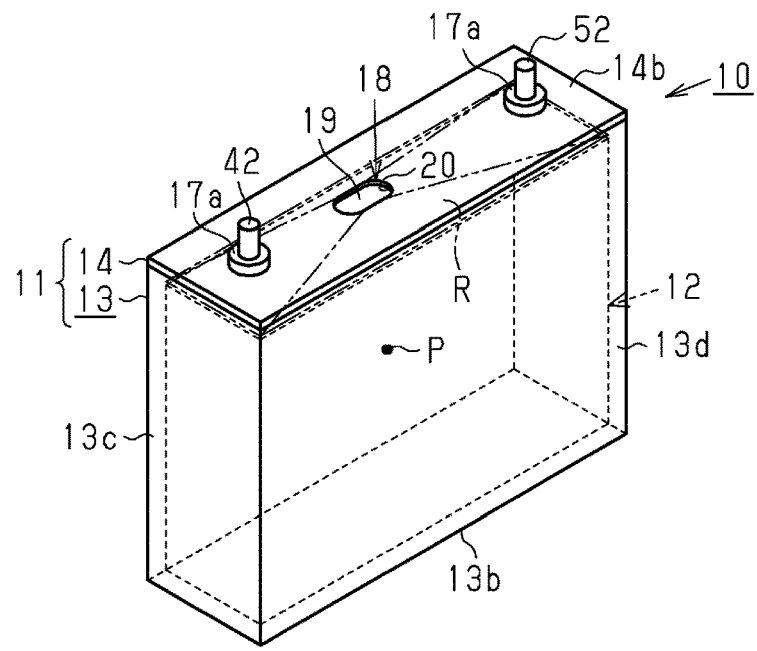
FIG. 2 is a perspective view showing the appearance of the rechargeable battery.

As shown in FIG. 1 or 2, a rechargeable battery 10, which serves as a power storage apparatus, includes a case 11. The rechargeable battery 10 includes an electrode assembly 12 and liquid electrolyte (not shown) contained in a case 11. The case 11 includes a case main body 13, which has an opening 13a, and a lid 14 for closing the opening 13a of the case main body 13.

The case main body 13 and the lid 14 are both made of aluminum. The case main body 13 includes a base wall 13b, which is planar and rectangle, short side walls 13c, which project from the short edges of the base wall 13b, and long side walls 13d, which project from the long edges of the base wall 13b. The case 11 has a parallelepiped shape, and the electrode assembly 12 also has a parallelepiped shape conforming to the case 11. The rechargeable battery 10 is a rectangular lithium ion battery.

Figure 3:
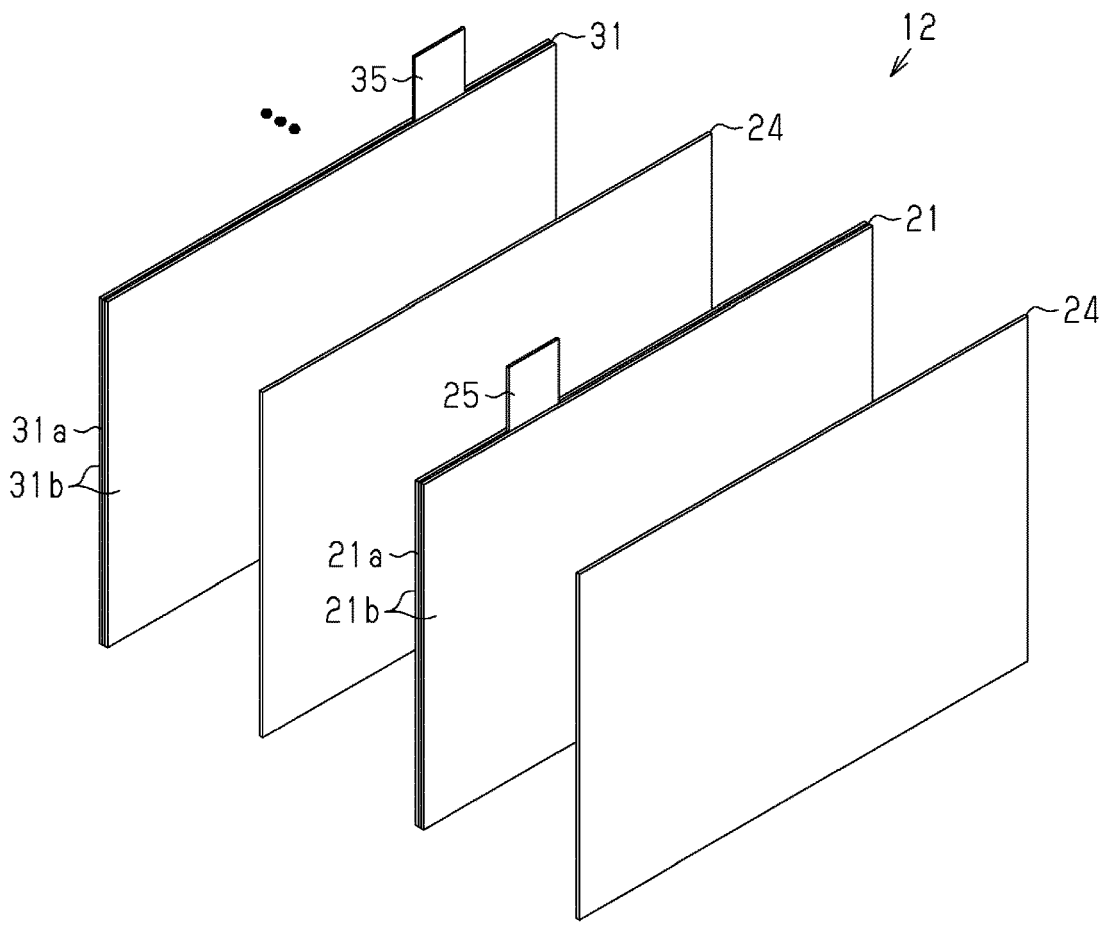
FIG. 3 is an exploded perspective view showing components of an electrode assembly.

As shown in FIG. 3, the electrode assembly 12 includes a plurality of positive electrodes 21 and a plurality of negative electrodes 31. The electrodes 21 and 31 are rectangular sheets. The positive electrodes 21 and the negative electrodes 31 are electrodes of different polarities. Each positive electrode 21 includes positive metal foil 21a (aluminum foil in the present embodiment) and positive active material layers 21b on the two surfaces of the positive metal foil 21a. Each negative electrode 31 includes negative metal foil 31a (copper foil in the present embodiment) and negative active material layers 31b on the two surfaces of the negative metal foil 31a. The electrode assembly 12 is a laminated electrode assembly, in which a separator 24 is sandwiched between adjacent positive and negative electrodes 21 and 31, forming a lamination structure. The separators 24 insulate the positive electrodes 21 from the negative electrodes 31. The electrode assembly 12 has a lamination direction that is identical with the transverse direction of the lid 14 of the case 11.

Each positive electrode 21 has a tab 25 projecting from a part of one side of the positive electrode 21. Each negative electrode 31 has a tab 35 projecting from a part of one side of the negative electrode 31. A plurality of positive electrode tabs 25 does not overlap with a plurality of negative electrode tabs 35 when the positive electrodes 21 and the negative electrodes 31 are stacked.

As shown in FIG. 1 or 2, the electrode assembly 12 includes a tab-side end face 12b facing the inner surface of the lid 14. The tab-side end face 12b has a transverse direction, which is identical with the lamination direction of the electrode assembly 12, and a longitudinal direction, which is the direction in which sides of the positive electrodes 21, the negative electrodes 31, and the separators 24 extend. The tabs 25 and 35 project from the tab-side end face 12b. The tab 25 of each positive electrode 21 is a part of the positive metal foil 21a, and the tab 35 of each negative electrode 31 is a part of the negative metal foil 31a. The positive metal foil 21a has a lower melting point than the negative metal foil 31a.

The rechargeable battery 10 includes a positive electrode tab group 26 projecting from the tab-side end face 12b. The positive electrode tab group 26 is formed by collecting and stacking all positive electrode tabs 25 at one side of the electrode assembly 12 in the lamination direction. The rechargeable battery 10 includes a negative electrode tab group 36 projecting from the tab-side end face 12b. The negative electrode tab group 36 is formed by collecting and stacking all negative electrode tabs 35 at one side of the electrode assembly 12 in the lamination direction.

The rechargeable battery 10 includes a positive electrode conductive member 41, which is located at one end of the tab-side end face 12b in the longitudinal direction. The positive electrode conductive member 41 is made of the same material as the positive metal foil 21a, which is aluminum in the present embodiment. The positive electrode conductive member 41 is a rectangular plate having a longitudinal axis extending in the longitudinal direction of the lid 14. At one end of the tab-side end face 12b in the longitudinal direction, the positive electrode conductive member 41 covers the tab-side end face 12b over its entire length in the transverse direction. One end of the positive electrode conductive member 41 in the longitudinal direction is joined to the positive electrode tab group 26. The other end of the positive electrode conductive member 41 in the longitudinal direction is joined to a positive terminal 42.

The rechargeable battery 10 includes a negative electrode conductive member 51, which is located at the other end of the tab-side end face 12b in the longitudinal direction. The negative electrode conductive member 51 is made of the same material as the negative metal foil 31a, which is copper in the present embodiment. The positive electrode conductive member 41 has a lower melting point than the negative electrode conductive member 51. The negative electrode conductive member 51 is a rectangular plate having a longitudinal axis extending in the longitudinal direction of the lid 14. At the other end of the tab-side end face 12b in the longitudinal direction, the negative electrode conductive member 51 covers the tab-side end face 12b over its entire length in the transverse direction. One end of the negative electrode conductive member 51 in the longitudinal direction is joined to the negative electrode tab group 36. The other end of the negative electrode conductive member 51 in the longitudinal direction is joined to a negative terminal 52. The positive and negative electrode conductive members 41 and 51 are placed between the inner surface 14a of the lid 14 and the tab-side end face 12b of the electrode assembly 12, which faces the inner surface 14a.

The positive electrode conductive member 41 is spaced apart from the negative electrode conductive member 51 in the longitudinal direction of the tab-side end face 12b. The positive and negative terminals 42 and 52 partially extend beyond the lid 14 and are exposed to the outside of the case 11. A ring-shaped insulator 17a is attached to each of the positive and negative terminals 42 and 52 to insulate them from the case 11.

The rechargeable battery 10 includes a pressure release valve 18 in the lid 14, which serves as a wall portion. The pressure release valve 18 tears when the pressure in the case 11 reaches a predetermined release pressure. Tearing of the pressure release valve 18 releases the pressure out of the case 11.

The release pressure of the pressure release valve 18 is set to a pressure that causes the pressure release valve 18 to tear before a crack or other breakage occurs in the case 11 itself or the joint section between the case main body 13 and the lid 14. The pressure release valve 18 includes a valve body 19, which is a thin plate having a thickness less than the thickness of the lid 14. The valve body 19 is located at the bottom of a recess 20 formed in the outer surface 14b of the lid 14, which is one of the two surfaces of the lid 14 that is on the outer side of the case 11. The valve body 19 is formed integrally with the lid 14.

Figure 4:
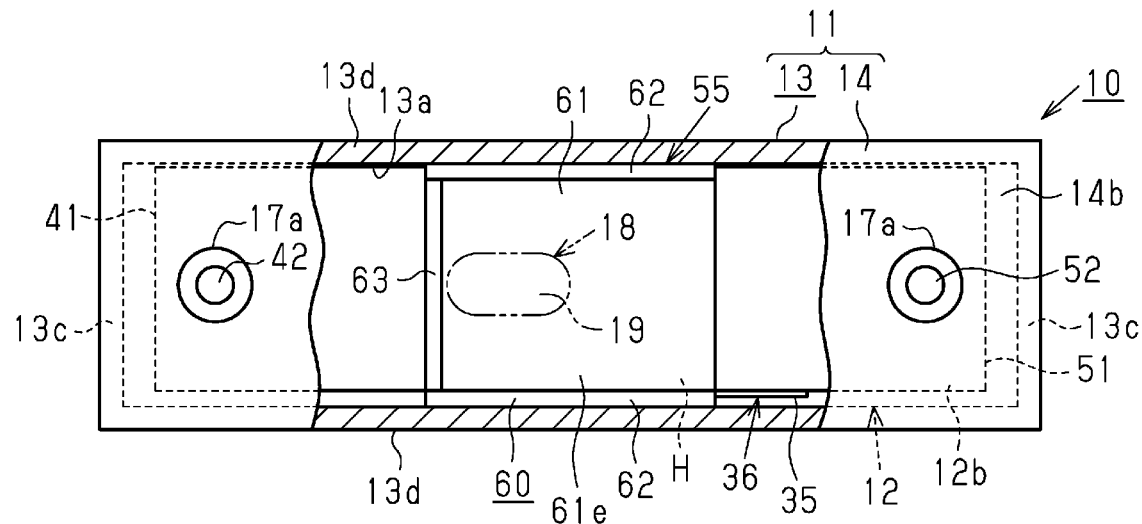
FIG. 4 is a plan view showing the rechargeable battery.
Figure 5:
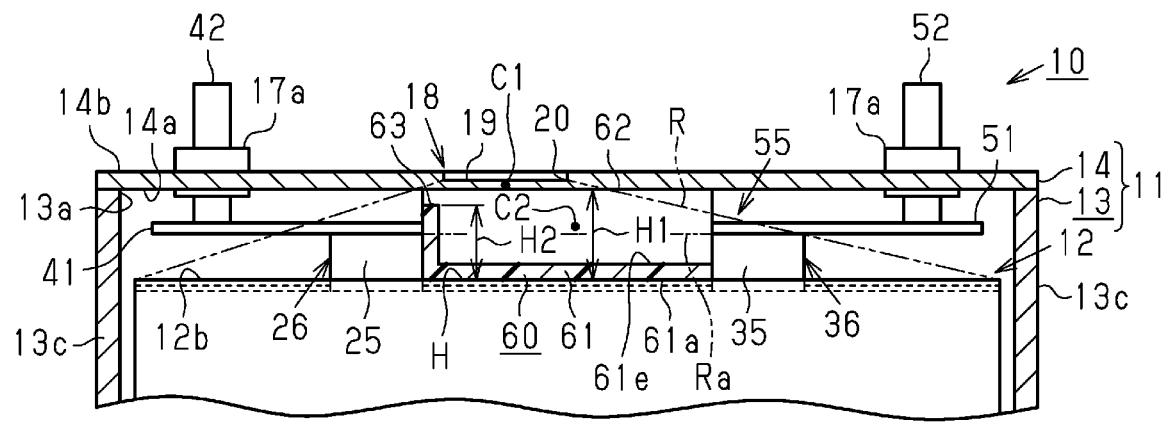
FIG. 5 is a partial cross-sectional view showing the inside of the rechargeable battery.

As shown in FIG. 4, the pressure release valve 18 is positioned closer to the positive terminal 42 than the center of the lid 14 in the longitudinal direction. The pressure release valve 18 is located at the center in the transverse direction of the lid 14. As shown in FIG. 5, the center position C1 of the pressure release valve 18 is closer to the positive electrode conductive member 41 than the center position C2 between the tabs 25 of the positive electrodes 21 (the tab group 26) and the tabs 35 of the negative electrodes 31 (the tab group 36) in the longitudinal direction of the lid 14. When the lid 14 is viewed from the side corresponding to the outer surface 14b, the pressure release valve 18 has the shape of an ellipse. The positive and negative electrode conductive members 41 and 51 are closer to the respective ends than the pressure release valve 18 in the longitudinal direction of the tab-side end face 12b and the lid 14, so that the conductive members 41 and 51 do not cover the pressure release valve 18 from the side corresponding to the electrode assembly 12. On the other hand, as viewed from side corresponding to the outer surface 14b of the lid 14, the positive and negative electrode conductive members 41 and 51 cover most of the end sections of the tab-side end face 12b in the longitudinal direction.

As shown in FIG. 1, 4 or 5, the rechargeable battery 10 includes a shield 60. The shield 60 is located between the positive and negative electrode conductive members 41 and 51 in the longitudinal direction of the tab-side end face 12b. Further, the shield 60 is located in the space between the inner surface 14a of the lid 14 and the tab-side end face 12b, and is placed on the tab-side end face 12b. The shield 60 is not fixed to the inner surface 14a of the lid 14 or the tab-side end face 12b, and can move slightly between the lid 14 and the electrode assembly 12. The shield 60 is made of plastic, preferably a heat-resistant plastic such as polyimide. Thus, the shield 60 does not short-circuit the components with positive potential and the components with negative potential in the case 11.

The shield 60 includes a shielding portion 61, which is planar and rectangle. The shielding portion 61 has a longitudinal axis extending in the longitudinal direction of the lid 14 and the tab-side end face 12b. The shield 60 includes first ribs 62 projecting toward the lid 14 from the pair of long edges of the shielding portion 61. Each first rib 62 has a longitudinal axis extending in the longitudinal direction of the lid 14. The shield 60 also includes a second rib 63. The second rib 63 projects toward the lid 14 from one of the pair of short edges of the shielding portion 61 that is closer to the positive electrode conductive member 41. The pair of first ribs 62 is connected to the second rib 63.

The outer surface of the second rib 63 can be in contact with one end face in the longitudinal direction of the positive electrode conductive member 41. Further, one end face of the shielding portion 61 can be in contact with a side surface of the negative electrode tab group 36. A slight movement of the shield 60 in the longitudinal direction of the lid 14 and the tab-side end face 12b immediately brings the shield 60 into contact with the positive electrode conductive member 41 or the negative electrode tab group 36. This restricts movement of the shield 60 in the longitudinal direction of the lid 14 and the tab-side end face 12b. The positive electrode conductive member 41 and the negative electrode tab group 36 therefore function as movement restriction members that restrict movement of the shield 60 in the longitudinal direction of the lid 14.

The outer surface of one of the first ribs 62 can be in contact with the inner surface of one of the long side walls 13d of the case main body 13, and the outer surface of the other first rib 62 can be in contact with the inner surface of the other long side wall 13d. The shield 60 is spaced apart from the inner surfaces of the long side walls 13d, which are inner surfaces of the case 11. However, a slight movement of the shield 60 in the transverse direction of the lid 14 and the tab-side end face 12b immediately brings the shield 60 into contact with one of the long side walls 13d. This restricts movement of the shield 60 in the transverse direction of the lid 14 and the tab-side end face 12b. As such, movement of the shield 60 in any directions along the tab-side end face 12b is restricted.

The shield 60 is located between the positive and negative electrode conductive members 41 and 51 in the longitudinal direction of the lid 14 and the tab-side end face 12b. The section surrounded by the positive electrode conductive member 41, the negative electrode conductive member 51, and the pair of long side walls 13d in the central area in the longitudinal direction of the lid 14 and the tab-side end face 12*b* is defined as a covered region H. The covered region H is covered by the shield 60. The direction in which a straight line extends to connect the inner surface 14*a* of the lid 14 and the bottom surface of the case main body 13 in the shortest distance is defined as a height direction. The shielding portion 61 of the shield 60 has an outer surface 61*a*, which is placed on the tab-side end face 12*b*, and an inner surface 61*e*, which faces the inner surface 14*a* of the lid 14.

As shown in FIG. 5, the shield 60 has a projection distance H1, which is the dimension of the first ribs 62 from the outer surface 61*a* of the shielding portion 61 in the direction in which the first ribs 62 project from the shielding portion 61. Further, the shield 60 has a projection distance H2, which is the dimension of the second rib 63 from the outer surface 61*a* of the shielding portion 61 in the direction in which the second rib 63 projects from the shielding portion 61. The projection distance H2 of the second rib 63 is shorter than the projection distance H1 of the first ribs 62. The projecting end of each first rib 62 extending from the shielding portion 61 is substantially in contact with the inner surface 14*a* of the lid 14. In contrast, the projecting end of the second rib 63 extending from the shielding portion 61 is spaced apart from the inner surface 14*a* of the lid 14. This is to provide a flow path that allows gas generated during a nail penetration test performed on the rechargeable battery 10 to flow from the side corresponding to the positive electrode conductive member 41 toward the pressure release valve 18. The projecting end of the second rib 63 extending from the shielding portion 61 is located between the positive electrode conductive member 41 and the lid. That is, the position of the projecting end of the second rib 63 is closer to the lid 14 than the positive electrode conductive member 41.

As shown in FIG. 4, in the shield 60 placed on the tab-side end face 12*b*, the pair of first ribs 62 can be in contact with sections of the inner surface 14*a* of the lid 14 in the region around the pressure release valve 18 that are located at the outer side of the pressure release valve 18 in the transverse direction of the lid 14. The second rib 63 is located at the outer side of the pressure release valve 18 in the longitudinal direction of the lid 14 and is positioned between the pressure release valve 18 and the positive electrode conductive member 41. Thus, the first ribs 62 and the second rib 63 do not overlap with the pressure release valve 18 as viewed from the side corresponding to the outer surface 14*b* of the lid 14. Movement of the electrode assembly 12 toward the lid 14 resulting from vibration of the rechargeable battery 10 moves the shield 60 toward the lid 14, bringing the first ribs 62 into contact with the inner surface 14*a* of the lid 14. This contact keeps the shielding portion 61 spaced apart from the lid 14. As such, in the present embodiment, the first ribs 62 serve as spacing portions of the shield 60.

When the shield 60 is viewed from the side corresponding to the electrode assembly 12 toward the inner surface 14*a* of the lid 14, the first ribs 62 and the second rib 63 are within the plane defined by the outline of the shielding portion 61. That is, the shield 60 does not have any flanges projecting from the outer surfaces of the ribs 62 and 63 to fix the shield 60 to the lid 14. The ribs 62 and 63 have flat outer surfaces.

Figure 6:
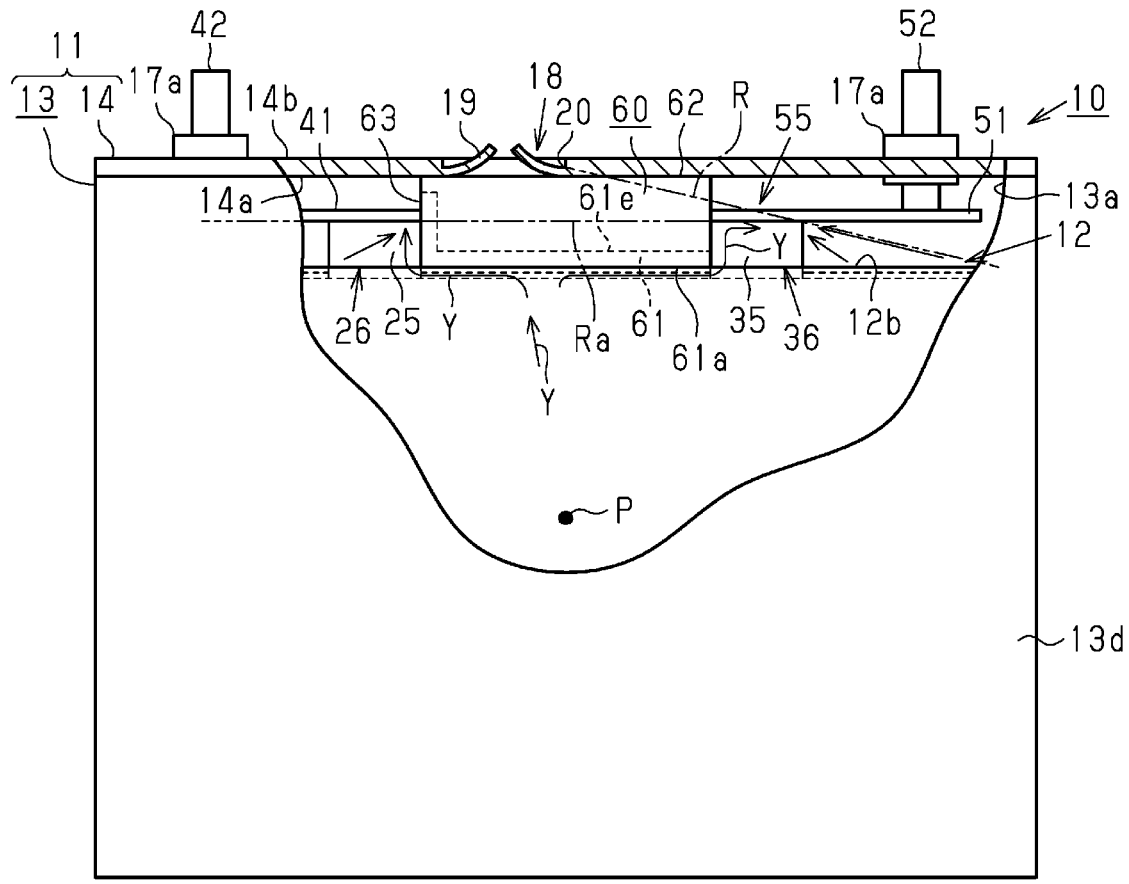
FIG. 6 is a partially cutaway front view showing the rechargeable battery in a nail penetration test.

As shown in FIG. 2 or 6, in a front view of the case 11, the position at which two diagonal lines intersect is defined as the center in the front view. Corresponding to this center in the front view, the point located in the center in the lamination direction of the electrode assembly 12 is defined as a center point P.

Further, as shown in FIG. 2 or 5, the region surrounded by the planes connecting the rectangular outline of the tab-side end face 12*b* to the outline of the valve body 19 of the pressure release valve 18 in the shortest distances is defined as a three-dimensional region R.

The three-dimensional region R is surrounded by the tab-side end face 12*b*, the surface of the valve body 19 of the pressure release valve 18, and the planes connecting the outline of the tab-side end face 12*b* to the outline of the valve body 19 in the shortest distances. The three-dimensional region R tapers from the tab-side end face 12*b* to the pressure release valve 18 and has a shape similar to a quadrangular pyramid. The pressure release valve 18 is located closer to the positive terminal 42 in the longitudinal direction of the lid 14. Thus, the top section of three-dimensional region R is offset from the center toward the positive terminal 42 in the longitudinal direction of the lid 14.

As shown in FIG. 5 or 6, the three-dimensional region R has a cross section Ra that is parallel to the tab-side end face 12*b* and extends along the lower surfaces of the positive electrode conductive member 41 and the negative electrode conductive member 51. The space between the tab-side end face 12*b* and the inner surface 14*a* of the lid 14 houses the positive electrode conductive member 41, the shield 60, and the negative electrode conductive member 51, which are located between the pressure release valve 18 and the tab-side end face 12*b*. The positive and negative electrode conductive members 41 and 51 cover most of the end regions in the longitudinal direction of the tab-side end face 12*b* along the longitudinal direction and the transverse direction. The shield 60 covers most of the region of the tab-side end face 12*b* that is located between the positive and negative electrode conductive members 41 and 51 along the longitudinal direction and the transverse direction. When the rechargeable battery 10 is viewed from the side corresponding to the outer surface 14*b* of the lid 14, the positive electrode conductive member 41, the shield 60, and the negative electrode conductive member 51 cover most of the tab-side end face 12*b* and the entire cross section Ra. In the present embodiment, the positive electrode conductive member 41, the shield 60, and the negative electrode conductive member 51 form a covering portion 55 that covers the entire cross section Ra.

Next, the operations of the rechargeable battery 10 will be described.

As shown in FIG. 6, when a nail is inserted in a nail penetration test from the center of the case 11 in a front view of the rechargeable battery 10 to the center point P of the electrode assembly 12, the nail extends within the electrode assembly 12 in the lamination direction. The nail breaks or melts the separators 24 between the positive and negative electrodes 21 and 31, causing a short circuit between the positive and negative electrodes 21 and 31 in the case 11.

The short circuit in the electrode assembly 12 generates heat around it, and the heat decomposes the liquid electrolyte components and thus generates gas. The generated gas increases the pressure in the rechargeable battery 10. Until the internal pressure of the case 11 reaches the release pressure, gas moves out of the electrode assembly 12 through the tab-side end face 12*b*. Then, when the internal pressure of the case 11 reaches the release pressure of the pressure release valve 18, the valve body 19 of the pressure release valve 18 tears. As indicated by arrows Y, the generated high-pressure gas flows from the entire tab-side end face 12b toward the torn pressure release valve 18, and is released out of the case 11 through the pressure release valve 18.

The force of the generated gas may scrape off fragments of the electrodes 21 and 31 and the metal foil 21a and 31a. The covering portion 55 covers the cross section Ra of the three-dimensional region R. Thus, gas moving from the tab-side end face 12b toward the pressure release valve 18 collides against the positive electrode conductive member 41, the shielding portion 61, or the negative electrode conductive member 51 of the covering portion 55, and changes the direction to move along the covering portion 55.

Gas moving toward the pressure release valve 18 after changing the direction in the collision against the covering portion 55 moves upward along a first rib 62 or the second rib 63 and then passes through the gap between the distal end face of the rib 62 or 63 and the inner surface 14a of the lid 14 to reach the pressure release valve 18.

Further, the gas that has passed between the tabs 25 of the positive electrode tab group 26 flows from the side corresponding to the positive electrode conductive member 41 to the pressure release valve 18 along the inner surface 61e of the shielding portion 61. The gas that has passed between the tabs 35 of the negative electrode tab group 36 flows from the side corresponding to the negative electrode conductive member 51 to the pressure release valve 18 along the inner surface 61e of the shielding portion 61. From all positions around the pressure release valve 18 in the shield 60, gas flows toward the pressure release valve 18. Therefore, paths of gas are created in any positions along the inner surface 61e of the shielding portion 61. In the present embodiment, the outer surfaces of the pair of first ribs 62 are perpendicular to the gas path extending in the transverse direction of the lid 14 toward the pressure release valve 18, and the outer surface of the second rib 63 is perpendicular to the gas path extending in the longitudinal direction of the lid 14 toward the pressure release valve 18.

The direction in which gas moves toward the pressure release valve 18 along the longitudinal direction and the surface direction of the lid 14 is defined as a gas discharge direction. Gas generated in a nail penetration test flows in a positive electrode-side gas discharge path, which extends from the side corresponding to the positive electrode conductive member 41 to the pressure release valve 18 beyond the second rib 63. Gas also flows in a negative electrode-side gas discharge path, which extends from the side corresponding to the negative electrode conductive member 51 to the pressure release valve 18.

In this configuration, the gas flowing in the positive electrode-side gas discharge path moves from the side corresponding to the positive electrode conductive member 41 to the pressure release valve 18 through the flow passage surrounded by the pair of first ribs 62, the second rib 63, and the lid 14.

The gas flowing in the negative electrode-side gas discharge path moves from the side corresponding to the negative electrode conductive member 51 to the pressure release valve 18 through the flow passage surrounded by the pair of first ribs 62, the shielding portion 61, and the lid 14. Then, the gas is discharged out of the case 11 through the torn pressure release valve 18.

The present embodiment has the following advantages.

(1) The covering portion 55 formed by the positive electrode conductive member 41, the shield 60, and the negative electrode conductive member 51 covers the entire cross section Ra, which is parallel to the tab-side end face 12b, of the three-dimensional region R connecting the tab-side end face 12b to the pressure release valve 18. As such, in a nail penetration test, gas emerging from the electrode assembly 12 through the tab-side end face 12b and moving linearly toward the torn pressure release valve 18 collides against the covering portion 55. This shifts the direction of the flowing gas from the straight path toward the pressure release valve 18, creating longer gas discharge paths to the pressure release valve 18. This allows fragments of the electrodes 21 and 31 and the metal foil 21a and 31a contained in the gas to fall in the case 11, reducing the fragments of the electrodes 21 and 31 and the metal foil 21a and 31a flying out of the case 11 together with the gas and becoming sparks.

(2) The positive and negative electrode conductive members 41 and 51, which are solid members fixed to the lid 14, and the shield 60, which is placed on the tab-side end face 12b, form the covering portion 55. Although the shield 60 is not fixed to the lid 14, the first ribs 62 of the shield 60 are brought into contact with the inner surface 14a of the lid 14 to maintain the space between the shielding portion 61 and the lid 14, thereby maintaining the distance between the two surfaces. This secures the flow passage of gas in the configuration in which the shield 60 forming the covering portion 55 is placed between the tab-side end face 12b and the inner surface 14a of the lid 14, ensuring the function of discharging gas out of the case 11 through the pressure release valve 18.

(3) The pair of first ribs 62 of the shield 60 is brought into contact with the sections of the inner surface 14a of the lid 14 that are at the outer side of the pressure release valve 18 in the transverse direction. As such, the first ribs 62 do not block the pressure release valve 18 even though the shield 60, unlike the positive electrode conductive member 41 or the negative electrode conductive member 51, is not fixed to the lid 14.

(4) The first ribs 62 of the shield 60 are at the outer side of the pressure release valve 18 in the transverse direction of the lid 14. In a nail penetration test, the increased temperature expands the electrode assembly 12 in the lamination direction, and gas flows from the either sides of the electrode assembly 12 in the lamination direction toward the pressure release valve 18. Consequently, at the position of the covering portion 55 immediately below the pressure release valve 18, fragments of the electrodes 21 and 31 and the metal foil 21a and 31a contained in the gas that collides against the first ribs 62 may fall from the gas.

(5) The shield 60 includes the second rib 63 extending in the transverse direction of the lid 14. The gas that flows toward the shield 60 after colliding against the positive electrode conductive member 41 may collide against the second rib 63, allowing fragments of the electrodes 21 and 31 and the metal foil 21a and 31a to fall from the gas.

(6) The second rib 63 of the shield 60 is located between the pressure release valve 18 and the positive electrode conductive member 41. Thus, even if the high-temperature, high-pressure gas melts or scrapes off fragments of the aluminum positive electrode conductive member 41 or the tabs 25, the fragments may collide against the second rib 63 and are thus less likely to be discharged out of the case 11.

(7) The shield 60 forms the covering portion 55 and covers the cross section Ra. However, the outer surfaces of the first ribs 62 are spaced apart from the inner surfaces of the long side walls 13d when the shield 60 is placed on the tab-side end face 12b. As such, while allowing fragments of the electrodes 21 and 31 and the metal foil 21a and 31a contained in the gas to fall in the case 11, the shield 60 does not block the pressure release valve 18 and therefore does not compromise the function of the pressure release valve 18.

(8) The shield 60 is placed on the tab-side end face 12b. Accordingly, gas emerging from the electrode assembly 12 through the tab-side end face 12b immediately collides against the shielding portion 61. Thus, the direction of gas flowing toward the pressure release valve 18 from the tab-side end face 12b is changed immediately, so that the gas discharge path to the pressure release valve 18 is immediately changed to be longer.

(9) The shield 60 is made of heat-resistant plastic. The shield 60 is thus less likely to be melted by the high-temperature gas generated in a nail penetration test, thereby maintaining the covering portion 55.

(10) The shield 60 includes a pair of first ribs 62 projecting from the shielding portion 61. Movement of the electrode assembly 12 toward the lid 14 resulting from vibration of the rechargeable battery 10 moves the shield 60 toward the lid 14, bringing the first ribs 62 into contact with the lid 14. The shield 60 thus prevents the electrode assembly 12 from colliding against the lid 14, limiting damage to the electrode assembly 12.

(11) The positive electrode-side gas discharge path, which is closer to the positive electrode conductive member 41, has a larger flow passage resistance than the negative electrode-side gas discharge path, which is closer to the negative electrode conductive member 51. In other words, the positive electrode-side gas discharge path has a smaller flow passage cross-sectional area than the negative electrode-side gas discharge path. In a nail penetration test, the high-temperature, high-pressure gas passing through the positive electrode tab group 26 or moving along the positive electrode conductive member 41 after colliding against the covering portion 55 may melt or scrape off fragments of the aluminum tabs 25 or the positive electrode conductive member 41. However, these fragments may collide against the second rib 63 and are less likely to be discharged out of the case 11.

Since the positive electrode-side gas discharge path has a greater flow passage resistance (a smaller flow passage cross-sectional area), gas tend to move toward the negative electrode conductive member 51. Since the negative electrode-side gas discharge path has a larger flow passage cross-sectional area than the positive electrode-side gas discharge path, gas easily flows through the negative electrode-side gas discharge path to the pressure release valve 18, thereby limiting an increase in the pressure in the case 11.

(12) The projecting end of the second rib 63 extending from the shielding portion 61 is closer to the lid 14 than the positive electrode conductive member 41. In a nail penetration test, the gas passing through the positive electrode tab group 26 may collide against the positive electrode conductive member 41 of the covering portion 55. The high-temperature, high-pressure gas may melt or scrape off fragments of the aluminum positive electrode conductive member 41. However, this gas may collide against the second rib 63, reducing the fragments of the positive electrode conductive member 41 that are discharged out of the case 11.

On the other hand, the projecting end of the second rib 63 extending from the shielding portion 61 is spaced apart from the inner surface 14a of the lid 14. This secures the path of gas flowing toward the pressure release valve 18 along the positive electrode conductive member 41. The gas from the side corresponding to the positive electrode conductive member 41 are thus discharged out of the case 11 through the pressure release valve 18, preventing an excessive increase in the pressure in the case 11.

(13) The shield 60 is made of heat-resistant plastic. For example, if the shield 60 is made of metal, the shield 60 requires a coating of insulating plastic or ceramic on its surface. The shield 60 made of heat-resistant plastic does not require a coating for insulation.

(14) The tab 25 of each positive electrode 21 is a part of the positive metal foil 21a, and the tab 35 of each negative electrode 31 is a part of the negative metal foil 31a. Thus, stacking the positive electrodes 21 and the negative electrodes 31 simply creates space for the shield 60, which forms the covering portion 55, between the tab group 26, in which the tabs 25 of the positive electrodes 21 are stacked, and the tab group 36, in which the tabs 35 of the negative electrodes 31 are stacked. For example, if tabs are provided separately from the electrodes 21 and 31, the space between the tabs would vary. This may prevent placement of the shield 60. The present embodiment does not have such a problem.

(15) The first ribs 62 of the shield 60 are free of a through-hole in the thickness direction. The first ribs 62 have a higher rigidity than a rib with a hole. When the gas generated in a nail penetration test moves the shield 60 toward the lid 14 causing the first ribs 62 to collide against the lid 14, the first ribs 62 resist deformation. This maintains the structure of the covering portion 55 including the shield 60.

(16) When the shield 60 is viewed from the side corresponding to the electrode assembly 12 toward the inner surface 14a of the lid 14, the first ribs 62 and the second rib 63 are within the plane defined by the outline of the shielding portion 61. That is, the shield 60 does not have any flanges projecting from the outer surfaces of the ribs 62 and 63 to fix the shield 60 to the lid 14. As compared with a configuration in which the shield 60 includes flanges for fixing the shield 60 to the lid 14, the present embodiment provides a wider space between the tab-side end face 12b and the lid 14.

(17) The outer surface of the second rib 63 can be in contact with one end face of the positive electrode conductive member 41 in the longitudinal direction. Further, one end face of the shielding portion 61 can be in contact with a side surface of the bent negative electrode tab group 36. Accordingly, the positive electrode conductive member 41 and the negative electrode tab group 36 restrict movement of the shield 60 in the longitudinal direction of the lid 14. The positive and negative electrode conductive members 41 and 51 are rigid members fixed to the lid 14. This ensures that the positive electrode conductive member 41, the negative electrode conductive member 51, and the shield 60 form the covering portion 55 and that the covering portion 55 covers the entire cross section Ra.

(18) The inner surface 61e of the shield 60 is flat. Thus, in a nail penetration test, the gas flowing into the shield 60 after colliding against the covering portion 55 easily flows toward the pressure release valve 18.

The above-described embodiment may be modified as follows.

Figure 7:
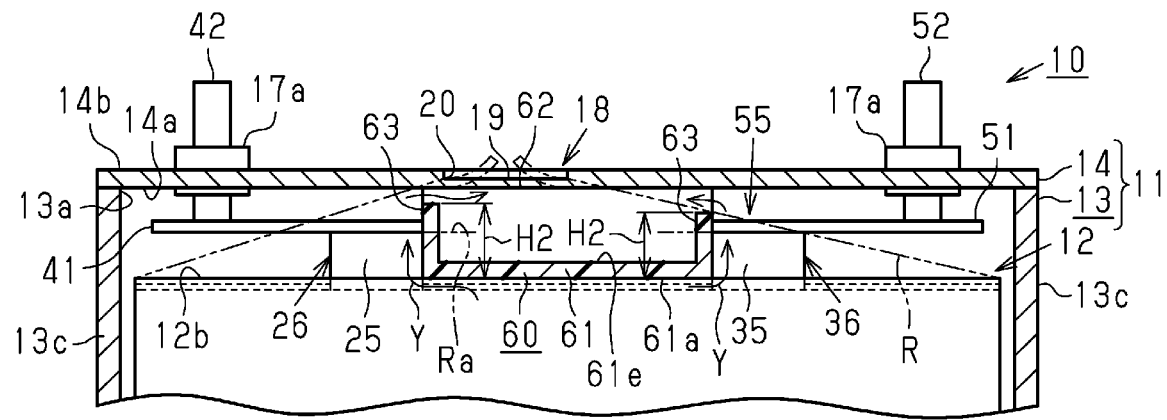
FIG. 7 is a partial cross-sectional view showing shield of a modification.

As shown in FIG. 7, in some embodiments and modes, the shield 60 may have second ribs 63 at the two short edges of the shielding portion 61. In this configuration, gas moves toward the pressure release valve 18 along the negative electrode conductive member 51 of the covering portion 55 after colliding against the negative electrode conductive member 51. The gas may collide against the second rib 63, allowing fragments of the electrodes 21 and 31 and the metal foil 21a and 31a contained in the gas to fall from the gas. The second rib 63 closer to the positive electrode conductive member 41 has a greater (higher) projection distance H2, which is the dimension from the outer surface 61a of the shielding portion 61, than the second rib 63 closer to the negative electrode conductive member 51. This is to set the flow passage resistance of the positive electrode-side gas discharge path to be greater than the flow passage resistance of the negative electrode-side gas discharge path, in other words, to set the flow passage cross-sectional area of the positive electrode-side gas discharge path to be smaller than the flow passage cross-sectional area of the negative electrode-side gas discharge path.

In some embodiments and modes, the shield 60 may include a second rib 63 at the short edge closer to the negative electrode conductive member 51, instead of the short edge closer to the positive electrode conductive member 41.

Figure 8:
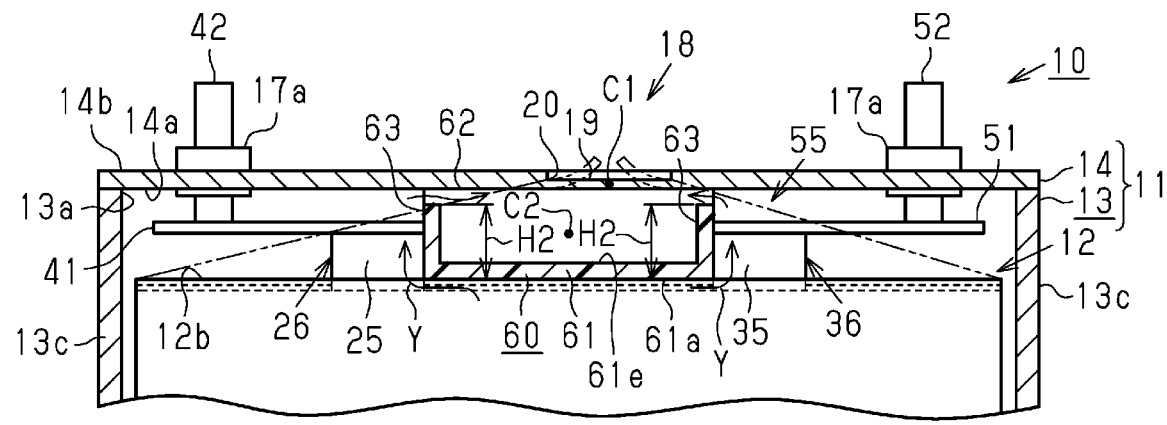
FIG. 8 is a partial cross-sectional view showing rechargeable battery of a modification.

As shown in FIG. 8, in some embodiments and modes, the center position C1 of the pressure release valve 18 may be closer to the negative electrode conductive member 51 than the center position C2 between the tabs 25 of the positive electrodes 21 (the tab group 26) and the tabs 35 of the negative electrodes 31 (the tab group 36) in the longitudinal direction of the lid 14.

In this configuration, when the shield 60 includes second ribs 63 having the same projection distance H2 at the two short edges of the shielding portion 61, the positive electrode-side gas discharge path is longer than the negative electrode-side gas discharge path. That is, the positive electrode-side gas discharge path has a greater flow passage resistance than the negative electrode-side gas discharge path.

In a nail penetration test, the gas passing between the positive electrode tabs 25 collides against the positive electrode conductive member 41. In this collision, the high-temperature, high-pressure gas may melt or scrape off fragments of the tabs 25 of the positive electrodes 21 and/or the positive electrode conductive member 41. However, the gas may collide against the lid 14 before being discharged out of the case 11 through the pressure release valve 18. This reduces the fragments of the tabs 25 and the positive electrode conductive member 41 that are discharged out of the case 11 through the pressure release valve 18.

Figure 9:
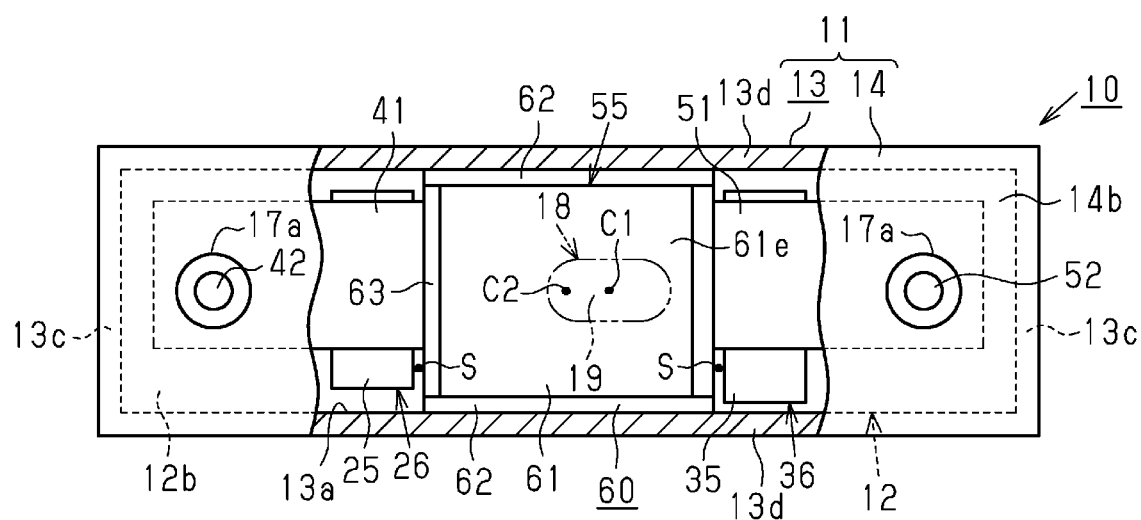
FIG. 9 is a plan view showing rechargeable battery of a modification.
Figure 10:
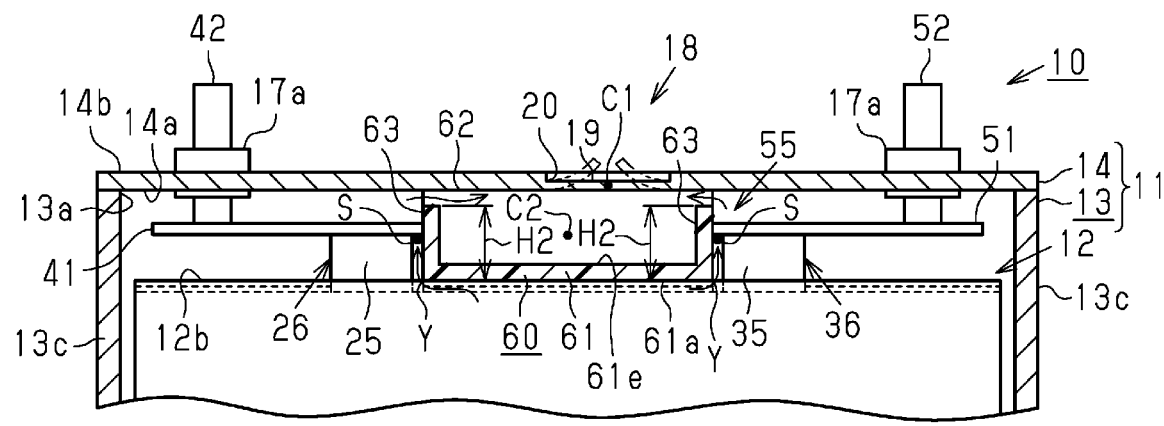
FIG. 10 is a partial cross-sectional view showing rechargeable battery of a modification.

In the rechargeable battery 10 with two second ribs 63 of the same projection distance H2, the tabs 25 of the positive electrodes 21 (the tab group 26) and the tabs 35 of the negative electrodes 31 (the tab group 36) may be modified as shown in FIG. 9 or 10.

A gap S may be provided between a side surface of the positive electrode tab group 26 and the side surface of the second rib 63 facing the tab group 26 in the longitudinal direction of the lid 14. Likewise, a gap S may be provided between a side surface of the negative electrode tab group 36 and the side surface of the second rib 63 facing the tab group 36 in the longitudinal direction of the lid 14. The distal end of the positive electrode conductive member 41 may be placed so as to cover the corresponding gap S from the side corresponding to the lid 14, so that that the positive electrode conductive member 41 functions as a gas collision member. Likewise, the distal end of the negative electrode conductive member 51 may be placed so as to cover the corresponding gap S from the side corresponding to the lid 14, so that that the negative electrode conductive member 51 functions as a gas collision member.

In this configuration, gas generated in a nail penetration test flows through the gap S between the second rib 63 of the shield 60 and the tabs 25 of the positive electrodes 21. This limits melting of the tabs 25 as compared with a configuration in which gas flows between the tabs 25 of the positive electrodes 21. After flowing through the gap S, the gas collides against the positive electrode conductive member 41. This collision allows fragments of the tabs 25 and the positive electrode conductive member 41 to fall from the gas, reducing the fragments that are discharged out of the case 11 through the pressure release valve 18.

Gas also flows on the negative side through the gap S between the second rib 63 of the shield 60 and the tabs 35 of the negative electrodes 31. This limits melting of the tabs 35 as compared with a configuration in which gas flows between the tabs 35 of the negative electrodes 31. After flowing through the gap S, the gas collides against the negative electrode conductive member 51. This collision allows fragments of the tabs 35 and the negative electrode conductive member 51 to fall from the gas, reducing the fragments that are discharged out of the case 11 through the pressure release valve 18.

Figure 11:
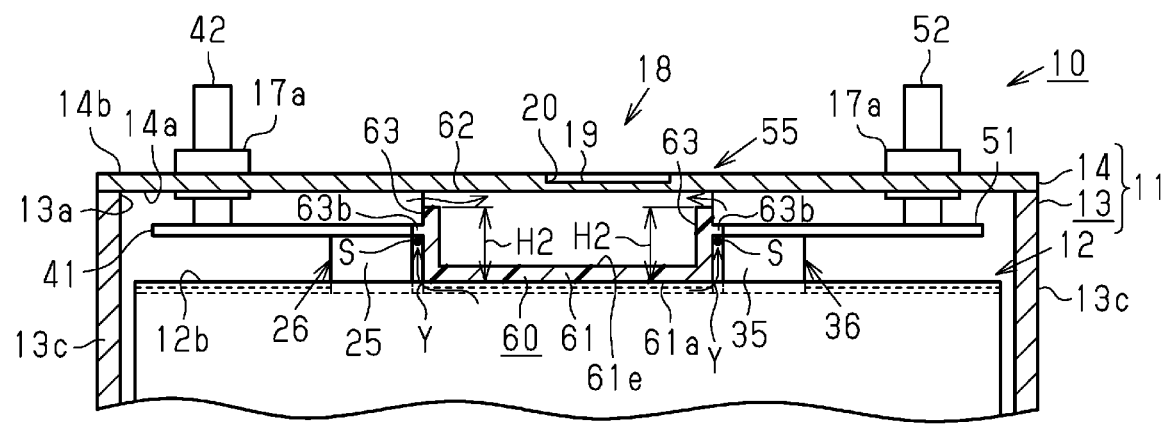
FIG. 11 is a cross-sectional view showing shield of a modification.

As shown in FIG. 11, protrusions 63b may extend from the second ribs 63 of the shield 60 toward the tabs 25 and 35 so as to function as gas collision members covering the gaps S from the side corresponding to the lid 14. In a modification not shown, the distal ends of the conductive members 41 and 51 and the protrusions 63b of the second ribs 63 all function as gas collision members.

Further, the gas collision members do not have to cover the entire gaps S, and distal ends of the conductive members 41 and 51 or the protrusions 63b of the second ribs 63 may include minute through-holes.

In the modes shown in FIGS. 9 to 11, the center position C1 of the pressure release valve 18 may be closer to the positive electrode conductive member 41 than the center position C2 between the tabs 25 of the positive electrodes 21 (the tab group 26) and the tabs 35 of the negative electrodes 31 (the tab group 36) in the longitudinal direction of the case main body 13. The two second ribs 63 may have different projection distances H2.

The shield 60 needs to separate the inner surface 14a of the lid 14 from the shielding portion 61 so as not to close the pressure release valve 18. For this purpose, the shield 60 may be configured to include spacing rods 64 as a spacing portion instead of the first ribs 62 and the second rib 63.

Figure 12:
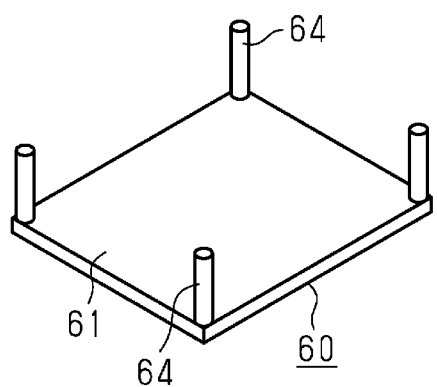
FIG. 12 is a perspective view showing shield of a modification.

As shown in FIG. 12, the spacing rods 64 project from the four corners of the shielding portion 61. The surfaces of the distal ends of the spacing rods 64 can be in contact with four sections in the inner surface 14a of the lid 14 around the pressure release valve 18.

In this configuration, when gas moves upward toward the pressure release valve 18 and collides against the outer surface 61a of the shielding portion 61, which forms the covering portion 55, the spacing rods 64 are brought into contact with the inner surface 14a of the lid 14, thereby maintaining the distance between the shielding portion 61 and the inner surface 14a. The shielding portion 61 does not close the pressure release valve 18.

Moreover, a flow path is secured between adjacent spacing rods 64, so that the gas moving toward the pressure release valve 18 are not blocked.

The thickness of the spacing rods 64 may be thicker than that shown in FIG. 12. This configuration reduces the possibility that gas generated in a nail penetration test damage the spacing rods 64, maintaining a state in which the shielding portion 61 covers the pressure release valve 18 from the side corresponding to the electrode assembly 12.

In some embodiments and modes, the first and second ribs 62 and 63 may be thicker to increase their rigidity. This configuration reduces the possibility that gas generated in a nail penetration test damage the first and second ribs 62 and 63. As a result, the first ribs 62 maintains a state in which the shielding portion 61 covers the pressure release valve 18 from the side corresponding to the electrode assembly 12. In addition, the second rib 63 maintains a state in which the positive electrode-side gas discharge path has a greater flow passage resistance than the negative electrode-side gas discharge path and the negative electrode-side gas discharge path has a larger flow passage cross-sectional area than the positive electrode-side gas discharge path.

In some embodiments and modes, the shielding portion 61 may be thicker to increase its rigidity. This configuration reduces the possibility that gas generated in a nail penetration test damage the shielding portion 61, maintaining a state in which the shielding portion 61 covers the pressure release valve 18 from the side corresponding to the electrode assembly 12.

Figure 13:
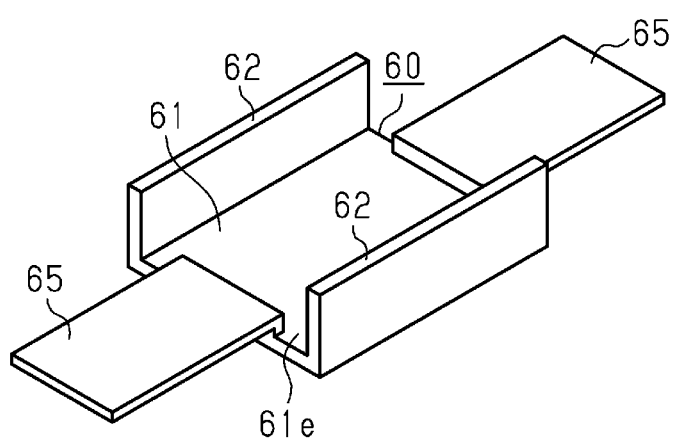
FIG. 13 is a perspective view showing shield of a modification.

As shown in FIG. 13, in some embodiments and modes, the shield 60 may include baffle plates 65 extending from the two short edges of the shielding portion 61 in the longitudinal direction of the shielding portion 61. The baffle plates 65 are flat.

Figure 14:
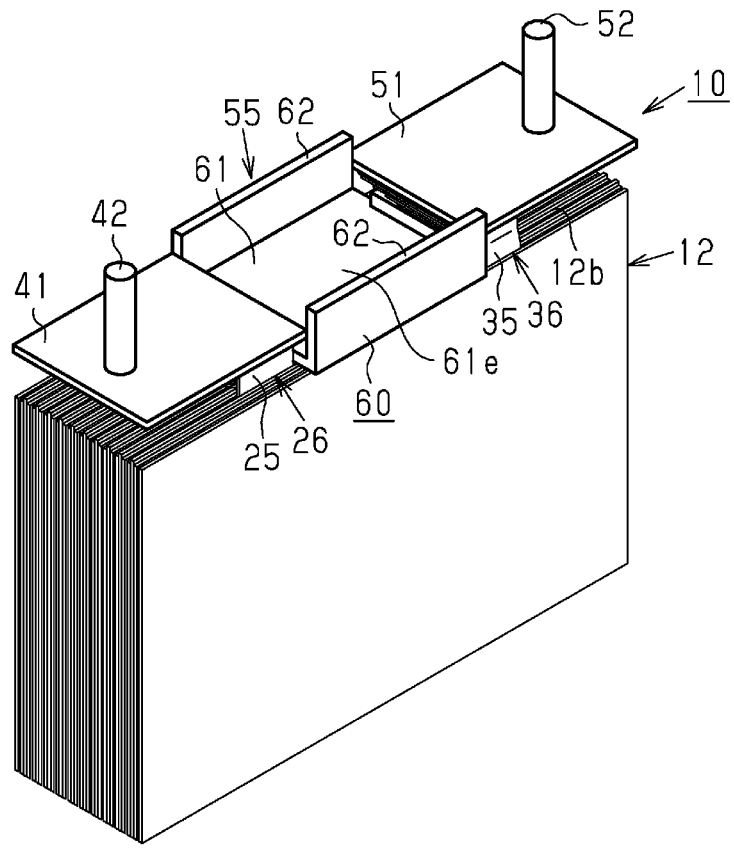
FIG. 14 is a partial perspective view showing a rechargeable battery including a shield of a modification.
Figure 15:
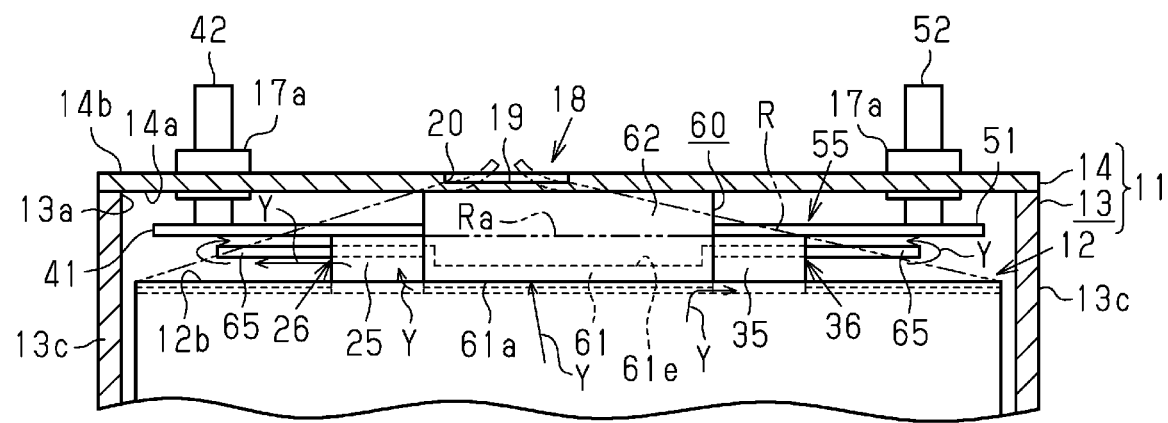
FIG. 15 is a partial cross-sectional view showing the inside of the rechargeable battery.

As shown in FIG. 14 or 15, each baffle plate 65 overlaps with the corresponding tabs 25 or 35 as viewed from the side corresponding to the outer surface 14b of the lid 14. The baffle plates 65 extend in the longitudinal direction of the lid 14 and cover the tabs 25 and 35 from the side corresponding to the electrode assembly 12. Each baffle plate 65 is located closer to the tab-side end face 12b than the positive and negative electrode conductive members 41 and 51 of the covering portion 55 but covers a part of the cross section Ra of the three-dimensional region R from the side corresponding to the electrode assembly 12. Thus, the baffle plates 65 form the covering portion 55.

In this configuration, as indicated by arrows Y, the gas emerging through the tab-side end face 12b and the gas emerging between the tabs 25 and 35 adjacent to one another in the lamination direction in the tab groups 26 and 36 may collide against the baffle plates 65. This shifts the direction of the flowing gas from the straight discharge path to the pressure release valve 18, creating longer gas discharge paths to the pressure release valve 18. This allows fragments of the electrodes 21 and 31 and the metal foil 21a and 31a contained in the gas to fall in the case 11, reducing the fragments of the electrodes 21 and 31 and the metal foil 21a and 31a flying out of the case 11 together with the gas and becoming sparks.

Figure 16:
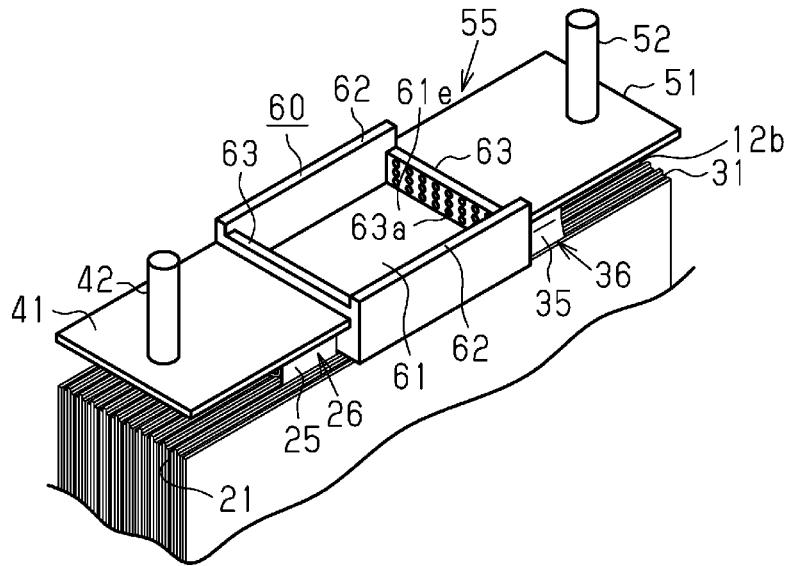
FIG. 16 is a perspective view showing a shield including gas passage holes in a second rib.
Figure 17:
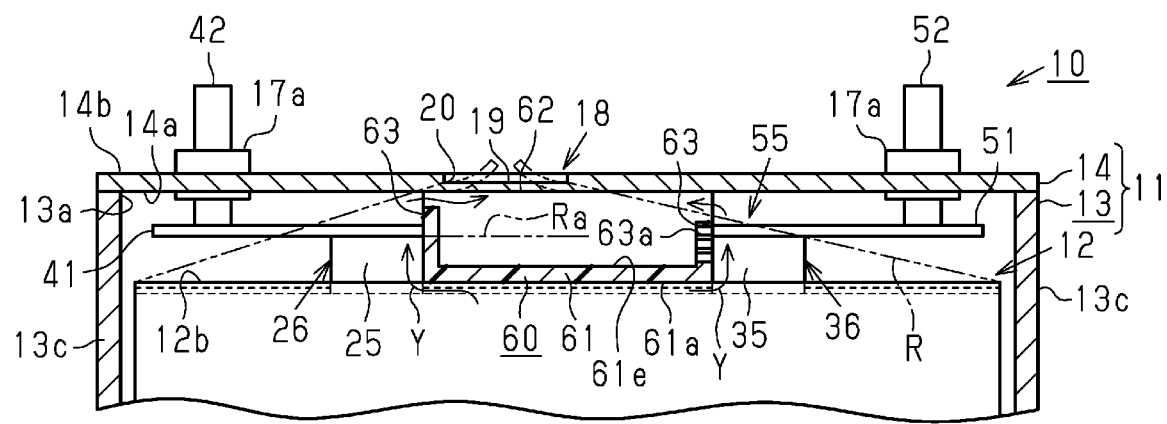
FIG. 17 is a cross-sectional view showing the shield including the gas passage holes in the second rib.

As shown in FIG. 16 or 17, when the shield 60 includes second ribs 63 at the two short edges of the shielding portion 61, the shield 60 may include a plurality of gas passage holes 63a in the second rib 63 that is closer to the negative electrode conductive member 51. The gas passage holes 63a extend through the second rib 63 in the thickness direction.

In this configuration, the fragments of the electrodes 21 and 31 and the metal foil 21a and 31a contained in the gas may collide against the second rib 63 and fall from the gas. On the other hand, the gas can pass through the gas passage holes 63a and be discharged out of the case 11 through the pressure release valve 18. The gas passage holes 63a function to filter out fragments of the electrodes 21 and 31 and the metal foil 21a and 31a, which can cause sparks. This reduces the fragments of the electrodes 21 and 31 and the metal foil 21a and 31a flying out of the case 11 together with gas and becoming sparks. The diameter of the gas passage holes 63a is preferably modified as appropriate according to the sizes of fragments of the electrodes 21 and 31 and the metal foil 21a and 31a contained in the gas. In addition, the diameter of the gas passage holes 63a is preferably set such that the negative electrode-side gas discharge path has a smaller flow passage resistance than the positive electrode-side gas discharge path, in other words, such that the negative electrode-side gas discharge path has a larger flow passage cross-sectional area than the positive electrode-side gas discharge path. Further, the second rib 63 that is closer to the positive electrode conductive member 41 may also include gas passage holes 63a, so that the shield 60 has gas passage holes 63a in both of the second ribs 63.

As shown in FIG. 18A, in some embodiments and modes, the shield 60 may include reinforcing ribs 74, which are connected to the shielding portion 61 and the corresponding first rib 62 and extend in the transverse direction of the shielding portion 61.

Alternatively, as shown to FIG. 18B, the shield 60 may include a reinforcing rib 75, which is connected to the shielding portion 61 and the second rib 63 and extends in the transverse direction of the shielding portion 61.

These configurations reinforce the shield 60 with the reinforcing ribs 74 and 75, limiting deformation of the shield 60, which would otherwise occur due to the collision of gas.

As shown in FIG. 19, in some embodiments and modes, the negative electrode conductive member 51 may include an overlapping section 51a, which is closer to the positive electrode conductive member 41 than the tab group 36. As viewed from the side corresponding to the outer surface 14b of the lid 14, the overlapping section 51a overlaps with the lid 14 and the shielding portion 61. The distal end face of the overlapping section 51a, which is an end face of the negative electrode conductive member 51 in the longitudinal direction, is aligned with an edge of the pressure release valve 18 as viewed from the side corresponding to the outer surface 14b of the lid 14. The overlapping section 51a does not cover the pressure release valve 18 from the side corresponding to the electrode assembly 12. The overlapping section 51a may be formed in the positive electrode conductive member 41. The overlapping section 51a covers a part of the cross section Ra of the three-dimensional region R and thus forms a part of the covering portion 55.

In this configuration, gas that moves toward the pressure release valve 18 along the negative electrode conductive member 51 after colliding against the covering portion 55 moves between the opposing surfaces of the overlapping section 51a and the shielding portion 61 toward the pressure release valve 18. As such, the overlapping section 51a limits contact between the lid 14 and high-temperature gas. The negative electrode conductive member 51 is made of copper and thus has high heat resistance. Accordingly, the overlapping section 51a is not melted by the gas and also limits melting of the lid 14.

Figure 20:
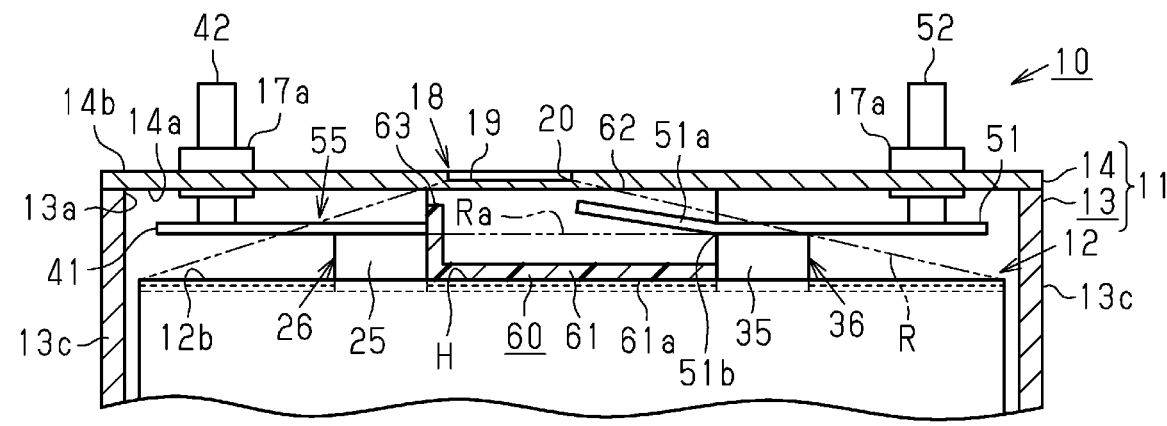
FIG. 20 is a partial cross-sectional view showing a negative electrode conductive member including an overlapping section and a bent section.

As shown in FIG. 20, in some embodiments and modes, the negative electrode conductive member 51 may include an overlapping section 51a, which is closer to the positive electrode conductive member 41 than the tab group 36. The negative electrode conductive member 51 may also include a bent section 51b, which is bent toward the lid 14 such that the distal end of the overlapping section 51a is closer to the pressure release valve 18. The bent section 51b may be at any position that is closer to the positive electrode conductive member 41 than the section where the tab group 36 is welded to the negative electrode conductive member 51. The overlapping section 51a does not cover the pressure release valve 18 from the side corresponding to the electrode assembly 12. The overlapping section 51*a* and the bent section 51*b* may be formed in the positive electrode conductive member 41. The overlapping section 51*a* covers a part of the cross section Ra of the three-dimensional region R and thus forms a part of the covering portion 55.

In this configuration, gas that moves toward the pressure release valve 18 along the negative electrode conductive member 51 after colliding against the covering portion 55 passes between the opposing surfaces of the overlapping section 51*a* and the shielding portion 61 and moves toward the pressure release valve 18 along the surface of the overlapping section 51*a*. Since the distal end face of the overlapping section 51*a* points toward the edge of the pressure release valve 18, the gas flowing along the overlapping section 51*a* moves toward the pressure release valve 18. As such, the gas is less likely to collide against the section of the lid 14 around the pressure release valve 18, limiting melting of the section of the lid 14 around the pressure release valve 18.

Figure 21:
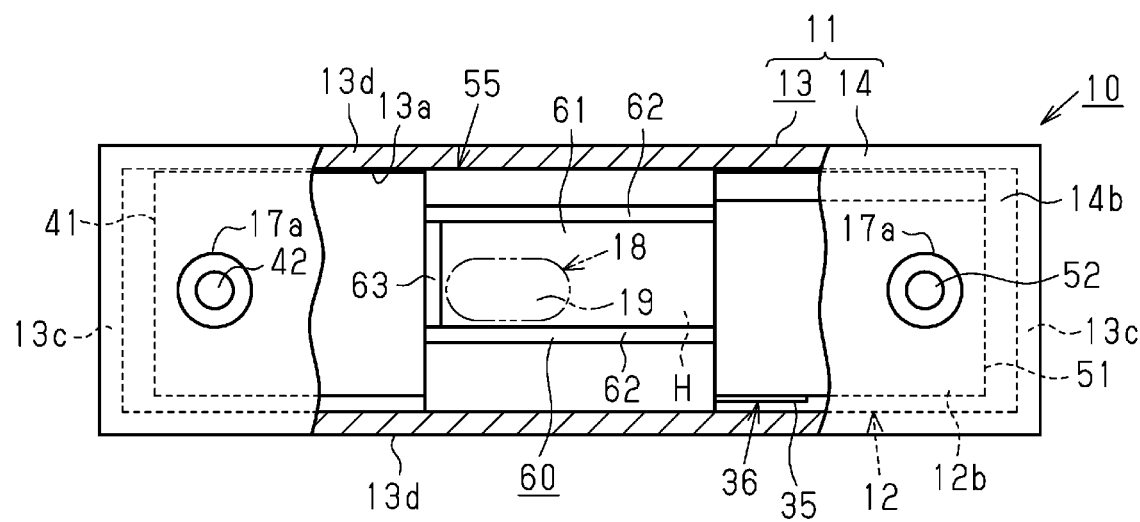
FIG. 21 is a plan view showing a shield including first ribs of a modification.

In some embodiments and modes, the pair of first ribs 62 of the shield 60 does not have to project from the two long edges of the shielding portion 61. For example, as shown in FIG. 21, the shielding portion 61 may include first ribs 62 that project from positions closer to each other in the transverse direction. As viewed from the side corresponding to the outer surface 14*b* of the lid 14, the first ribs 62 may be located between the positive and negative electrode conductive members 41 and 51, which are arranged in the longitudinal direction of the lid 14.

In this configuration, the distal end face of the positive electrode conductive member 41, which is one end face in the longitudinal direction, can be in contact with one end face in the longitudinal direction of each of the first ribs 62. The distal end face of the negative electrode conductive member 51, which is one end face in the longitudinal direction, can be in contact with the other end face in the longitudinal direction of each of the first ribs 62. When the shield 60 slightly moves in the longitudinal direction of the lid 14, the shield 60 is immediately brought into contact with the distal end face of the positive electrode conductive member 41 or the negative electrode conductive member 51. This restricts movement of the shield 60 between the positive and negative electrode conductive members 41 and 51 in the longitudinal direction of the tab-side end face 12*b* and the lid 14, maintaining a state in which the shield 60 forms the covering portion 55. As such, the positive and negative electrode conductive members 41 and 51 function as movement restriction members that restrict movement of the shield 60 in the longitudinal direction of the tab-side end face 12*b* and the lid 14.

In some embodiments and modes, in order to restrict movement of the shield 60 in the longitudinal direction of the tab-side end face 12*b* and the lid 14, the second rib 63 may be brought into contact with the side surface of the positive electrode tab group 26, and the first ribs 62 may be brought into contact with the side surface of the negative electrode tab group 36.

In some embodiments and modes, in order to restrict movement of the shield 60 in the longitudinal direction of the tab-side end face 12*b* and the lid 14, the second rib 63 may be brought into contact with the side surface of the positive electrode tab group 26, and the first ribs 62 may be brought into contact with the end face of the negative electrode conductive member 51.

Figure 22:
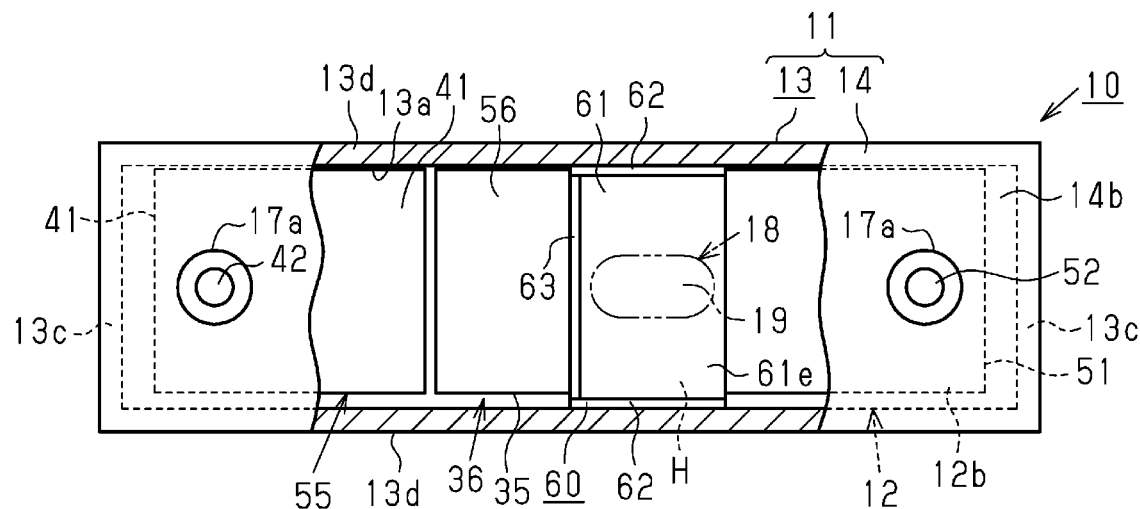
FIG. 22 is a plan view showing a shield supported by a negative electrode conductive member.
Figure 23:
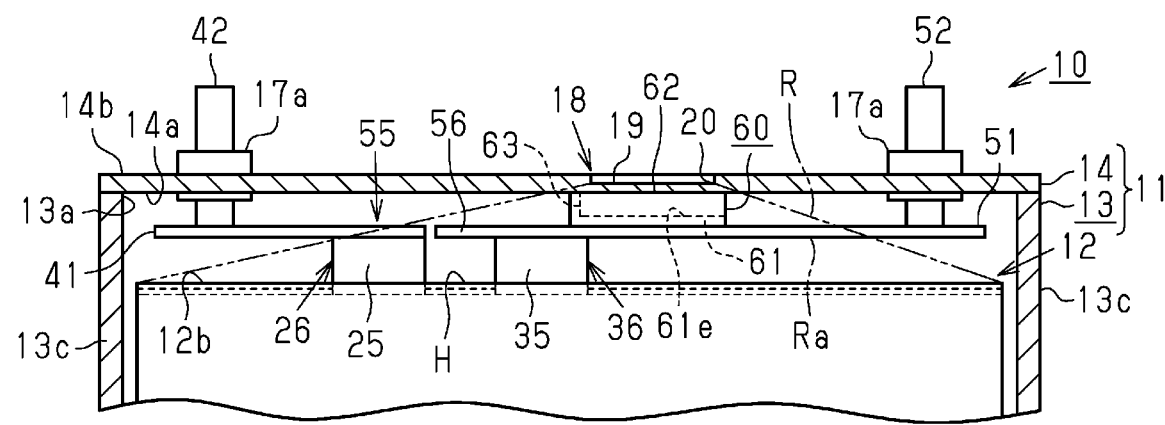
FIG. 23 is a partial cross-sectional view showing a rechargeable battery including the shield supported by the negative electrode conductive member.

As shown in FIG. 22 or 23, in some embodiments and modes, as viewed from the side corresponding to the outer surface 14*b* the lid 14, the pressure release valve 18 may overlap with the negative electrode conductive member 51, and the shield 60 may be placed on the negative electrode conductive member 51. Further, the positive electrode conductive member 41 or the negative electrode conductive member 51 (the negative electrode conductive member 51 in the example shown in FIG. 22 or 23) includes an extension section 56, which covers the gap between the positive electrode tab group 26 and the negative electrode tab group 36 in the longitudinal direction of the tab-side end face 12*b*. The positive and negative electrode conductive members 41 and 51 form the covering portion 55, which covers the entire cross section Ra of the three-dimensional region R.

In this configuration, the shield 60 includes ribs each having a surface intersecting with a gas path. First ribs 62 and a second rib 63 project from the shielding portion 61 toward the lid 14 and have outer surfaces intersecting with gas paths along the inner surface 61*e* of the shielding portion 61.

Gas generated in a nail penetration test collides against the covering portion 55, which is formed by the positive and negative electrode conductive members 41 and 51, and then flows along the positive and negative electrode conductive members 41 and 51 toward the pressure release valve 18. The gas then flows in gas paths along the inner surface 61*e* of the shielding portion 61. Other gas collides against and moves upward along the first ribs 62 or the second rib 63, passes through the gap between the distal end faces of the ribs 62, 63 and the inner surface 14*a* of the lid 14, and reaches the pressure release valve 18.

The collision of gas against the first and second ribs 62 and 63 allows fragments of the electrodes 21 and 31 and the metal foil 21*a* and 31*a* contained in the gas to fall in the case 11, reducing the fragments of the electrodes 21 and 31 and the metal foil 21*a* and 31*a* flying out of the case 11 together with the gas and becoming sparks. Although not shown, the pressure release valve 18 may overlap with the positive electrode conductive member 41 as viewed from the side corresponding to the outer surface 14*b* the lid 14 and the pressure release valve 18 may be placed on the positive electrode conductive member 41.

Figure 24A:
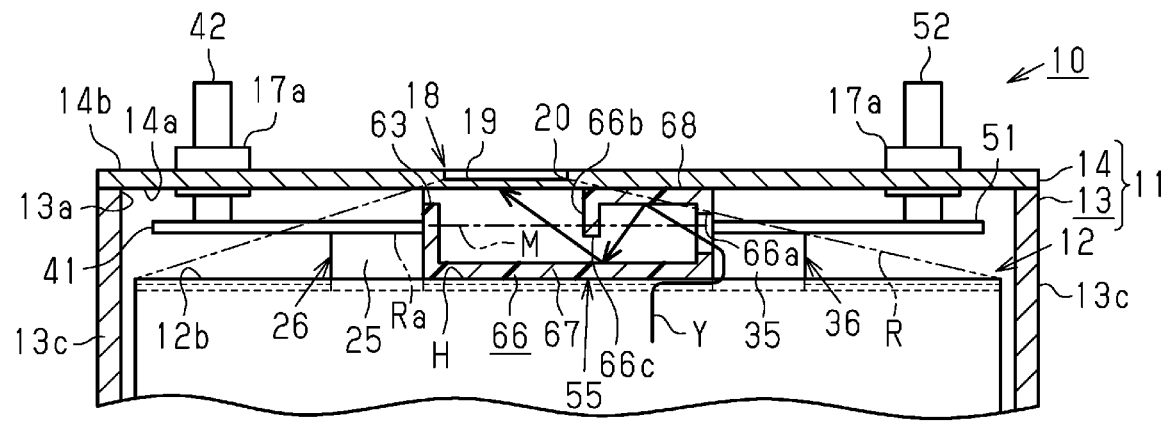
FIG. 24A is a cross-sectional view showing a shield including a path changing wall.

FIG. 24A shows a shield 66 that has a tetragonal tubular shape. The shield 66 is placed on the tab-side end face 12*b* such that the central axis M of the shield 66 extends in the longitudinal direction of the tab-side end face 12*b* and the lid 14. The positive electrode conductive member 41, the shield 66, and the negative electrode conductive member 51 form the covering portion 55. The shield 66 includes a shielding portion 67 at the base supported by the tab-side end face 12*b* of the electrode assembly 12. The shield 66 includes a gas inlet 66*a* located at one side in the axial direction (the side facing the negative electrode conductive member 51). The shield 66 also includes a gas outlet 66*b* in the top plate 68 facing the lid 14. The gas outlet 66*b* is located at the other side in the axial direction and opens toward the pressure release valve 18. In addition, the shield 66 includes a path changing wall 66*c*, which is located inside the shield 66. The path changing wall 66*c* is planar and projects from the inner surface of the top plate 68 toward the shielding portion 67. A gap separates the projecting end of the path changing wall 66*c* from the shielding portion 67. The path changing wall 66*c* has a longitudinal axis extending in the transverse direction of the lid 14.

In this configuration, gas generated in a nail penetration test collides against the covering portion 55. Then, as indicated by arrows Y, the gas moving toward the pressure release valve 18 along the negative electrode conductive member 51 flows into the shield 66 through the gas inlet 66*a*.

The gas flowing toward the gas outlet 66b, which opens toward the pressure release valve 18, may collide against the top plate 68 of the shield 66. Then, the path changing wall 66c changes the path of the gas to move toward the shielding portion 67. The gas then flows between the path changing wall 66c and the shielding portion 67 and flows out of the shield 66 through the gas outlet 66b. Then, the gas is released out of the case 11 through the pressure release valve 18.

The path changing wall 66c allows gas to collide against the top plate 68 and the shielding portion 67 in the shield 66. The collision of gas against the shielding portion 67 and the top plate 68 allows fragments of the electrodes 21 and 31 and the metal foil 21a and 31a contained in the gas to fall in the case 11, reducing the fragments of the electrodes 21 and 31 and the metal foil 21a and 31a flying out of the case 11 together with the gas and becoming sparks. In addition, the collision of gas against the shielding portion 67 and the top plate 68 reduces the momentum of the gas, allowing fragments of the electrodes 21 and 31 and the metal foil 21a and 31a to fall from the gas.

Figure 24B:
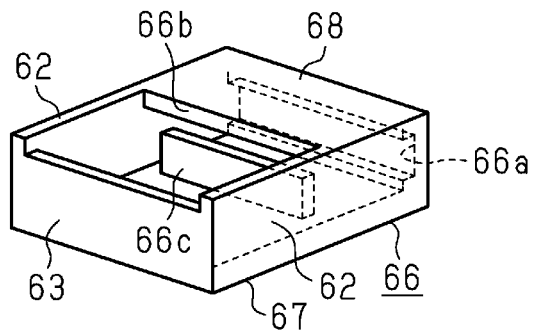
FIG. 24B is a perspective view showing a shield of a modification.

As shown in FIG. 24B, the path changing wall 66c may project from the inner surface of the shielding portion 67 instead of the top plate 68, leaving a gap between the projecting end of the path changing wall 66c and the top plate 68 and gaps between the path changing wall 66c and the two first ribs 62. In this configuration, the gas flowing into the shield 66 through the gas inlet 66a collide not only against the top plate 68 and the shielding portion 67 but also against the first ribs 62 connecting the shielding portion 67 to the top plate 68.

Figure 25:
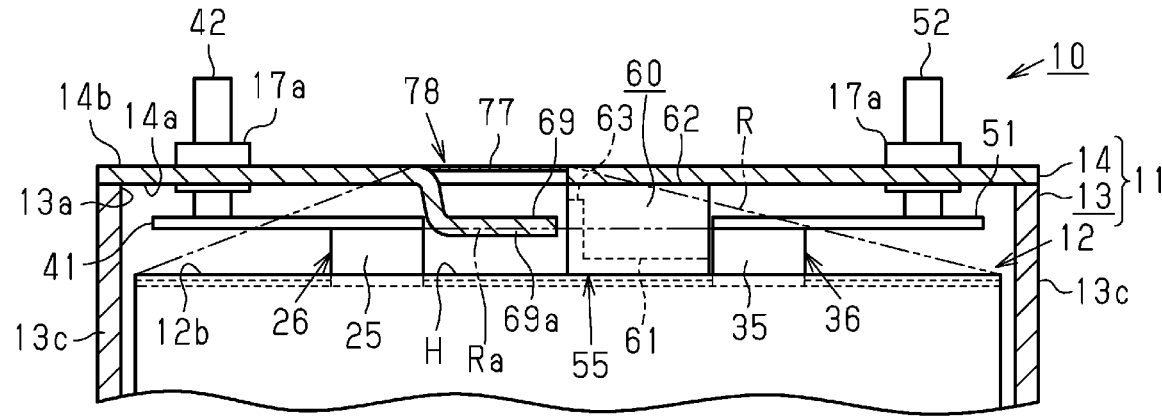
FIG. 25 is a partial cross-sectional view showing a shield formed by stamping a lid.

As shown in FIG. 25, in some embodiments and modes, the lid 14 may be stamped so as to be formed integrally with a shield 69. The shield 69 may be placed between the inner surface 14a of the lid 14 and the tab-side end face 12b of the electrode assembly 12 such that the shield 69 does not cause a short circuit between the positive electrodes 21 and the negative electrodes 31. To prevent the shield 69 from causing a short circuit between the positive electrodes 21 and the negative electrodes 31, the surface 69a of the shield 69 is covered with a coating of an insulating plastic or ceramic.

Further, a sheet-shaped valve body 77 may cover the hole in the lid 14, which results from the shield 69 formed in the lid 14, and the valve body 77 may serve as a pressure release valve 78. The release pressure of the pressure release valve 78 is set to a pressure that causes the pressure release valve 78 to tear before a crack or other breakage occurs in the case 11 itself or the joint section between the case main body 13 and the lid 14.

In addition, a shield 60 may be placed on the tab-side end face 12b between the negative electrode conductive member 51 and the shield 69 that is integral with the lid 14 in the longitudinal direction of the tab-side end face 12b and the lid 14. The positive electrode conductive member 41, the negative electrode conductive member 51, the shield 69 that is integral with the lid 14, and the shield 60 that is placed on the tab-side end face 12b form the covering portion 55.

Figure 26:
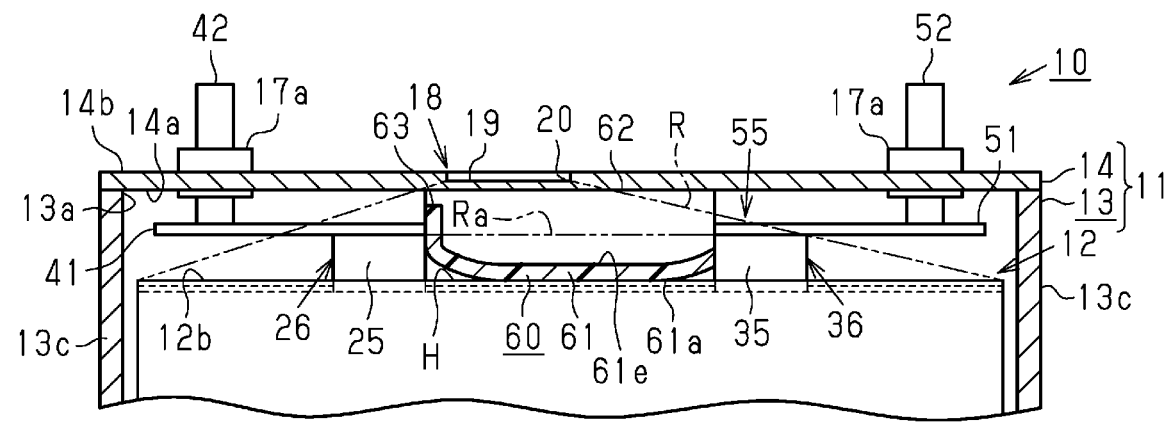
FIG. 26 is a partial cross-sectional view showing a shield including a round shielding portion.

As shown in FIG. 26, in some embodiments and modes, the shielding portion 61 may have a round shape and gently bulge toward the tab-side end face 12b from its periphery to the central portion. In this configuration, the first ribs 62 are brought into contact with the inner surface 14a of the lid 14. This restricts movement of the shield 60 between the inner surface 14a of the lid 14 and the tab-side end face 12b of the electrode assembly 12. The round shape is not limited to the shape shown in FIG. 26, and the entire section from the periphery to the central section of the shielding portion 61 may bulge toward the tab-side end face 12b.

In this configuration, gas moving toward the pressure release valve 18 in a nail penetration test collides against the outer surface 61a of the shielding portion 61 of the covering portion 55. The shielding portion 61 with the round shape resists deformation, which would otherwise be caused by the gas.

Figure 27:
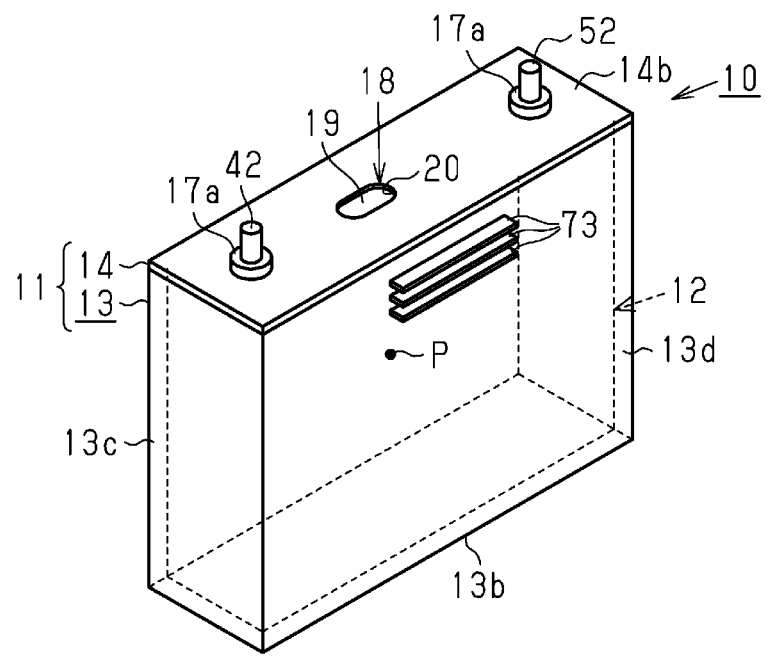
FIG. 27 is a perspective view showing a rechargeable battery including case ribs.

As shown in FIG. 27, in some embodiments and modes, the rechargeable battery 10 may include case ribs 73 on a long side wall 13d of the case main body 13. The case ribs 73 are rectangular plates, each having a longitudinal axis extending in the longitudinal direction of the long side wall 13d. The case ribs 73 are arranged in the transverse direction of the long side wall 13d. As viewed from the side corresponding to the outer surface 14b the lid 14, the case ribs 73 extend along the first ribs 62 of the shield 60.

In this configuration, the increased temperature during a nail penetration test expands the electrode assembly 12 in the lamination direction, and this expansion acts to deform and expand the case 11 in the lamination direction. However, the case ribs 73 allow the case 11 to resist deformation in the lamination direction. As a result, the gaps between the outer surfaces of the first ribs 62 of the shield 60 and the inner surfaces of the long side walls 13d are unlikely to widen and facilitate passage of gas.

Figure 28:
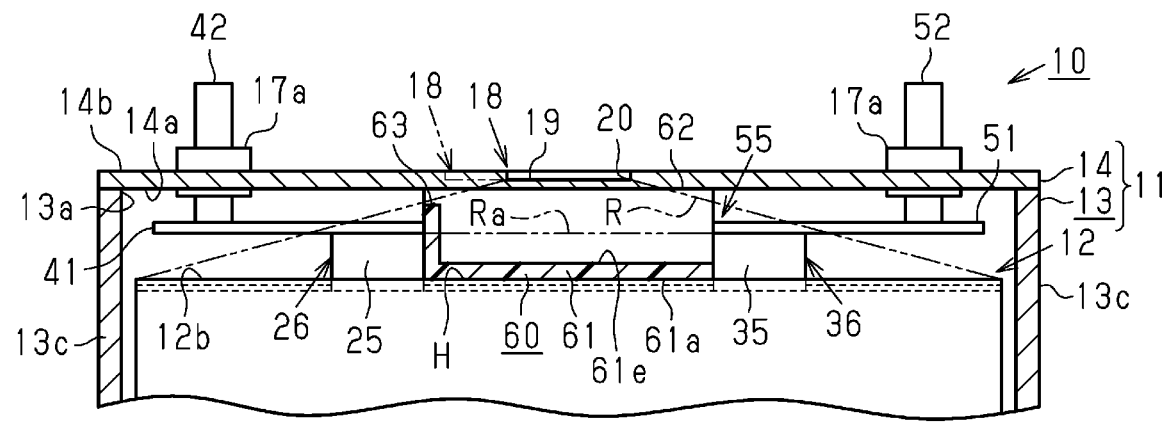
FIG. 28 is a partial cross-sectional view showing a rechargeable battery in which a pressure release valve is shifted toward the negative electrode conductive member.

In some embodiments, as shown in FIG. 28, the pressure release valve 18 may be closer to the negative electrode conductive member 51 than that of the embodiment described above. In this configuration, gas collides against the shield 60 of the covering portion 55 and then changes the direction toward the negative electrode conductive member 51. Then, the gas turns at the edge of the shielding portion 61 and moves toward the pressure release valve 18. Since the pressure release valve 18 is closer to the negative electrode conductive member 51, the gas that has turned at the shielding portion 61 toward the pressure release valve 18 are less likely to collide against the lid 14, reducing the likelihood that the heat of the gas melts the lid 14.

Figure 29:
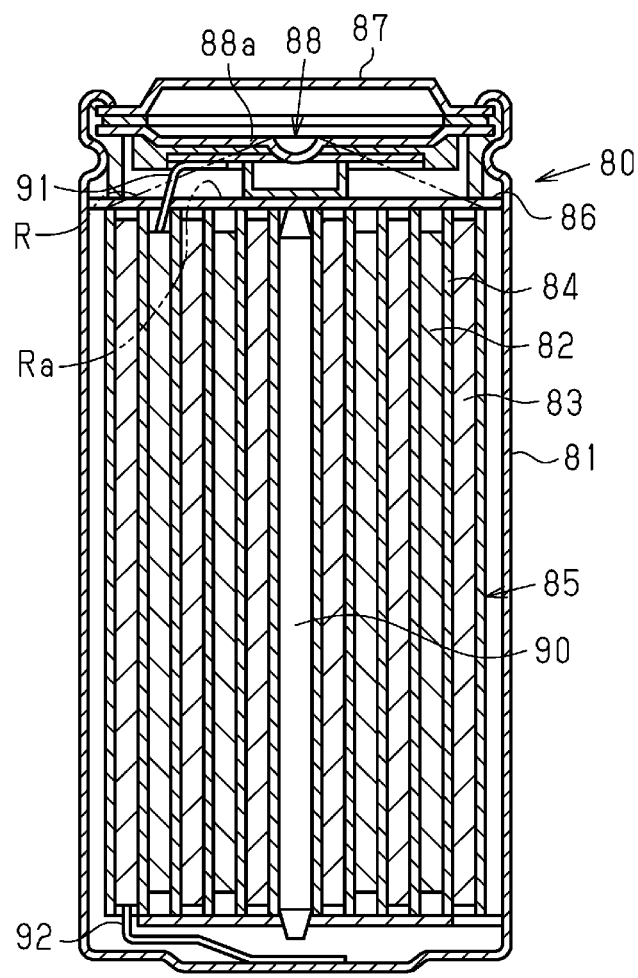
FIG. 29 is a cross-sectional view showing a cylindrical rechargeable battery.

As shown in FIG. 29, a rechargeable battery 80 may be cylindrical. The rechargeable battery 80 has a spiral-type electrode assembly 85 in a cylindrical tubular case 81. The electrode assembly 85 includes a strip-shaped positive electrode 82 and a strip-shaped negative electrode 83, which are stacked and rolled with a separator 84 placed between them. The case 81 is made of metal and has a closed end and an open end in the axial direction. The case 81 is filled with liquid electrolyte, which is absorbed into the separator 84. The rechargeable battery 80 also includes insulating plates 86 at the two axial ends of the electrode assembly 85.

At the open end of the case 81, the rechargeable battery 80 includes a lid 87 and a pressure release valve 88 provided inside the lid 87. The pressure release valve 88 is electrically connected to the lid 87. When the pressure in the case 81 reaches the release pressure in a nail penetration test or due to an internal short circuit, the disc plate 88a of the pressure release valve 88 tears and releases the pressure out of the case 81.

The rechargeable battery 80 also includes a center pin 90 located at the center of the electrode assembly 85. The positive electrode 82 of the electrode assembly 85 is connected to a positive electrode lead 91, and the negative electrode 83 is connected to a negative electrode lead 92. One end of the positive electrode lead 91 is fixed to the positive electrode 82, and the other end is welded to the pressure release valve 88 so as to be electrically connected to the lid 87. One end of the negative electrode lead 92 is fixed to the negative electrode 83, and the other end is welded to the case 81 to be electrically connected.

The spiral-type rechargeable battery 80 has a three-dimensional region R connecting the outline of an axial end face of the electrode assembly 85 and the outline of the pressure release valve 88. A cross section Ra of the three-dimensional region R is entirely covered by the insulating plate 86 described above. Thus, in this embodiment, the insulating plate 86 forms the covering portion.

The shield 60 may be made of metal. When the shield 60 is made of metal, an insulating member is placed between members with positive electric potential (the positive electrode conductive member 41 and the positive electrodes 21) and members with negative electric potential (the negative electrode conductive member 51 and the negative electrodes 31). The insulating member may be formed integrally with one or both of the shield 60 and a member with electric potential. The insulating member may be a coating of insulating plastic or ceramic, for example.

Alternatively, when the shield 60 is made of metal, the shield 60 is arranged so as to be in contact with only either a member with positive electric potential (the positive electrode conductive member 41 and the positive electrodes 21) or a member of negative electric potential (the negative electrode conductive member 51 and the negative electrode 31).

This configuration reduces the likelihood of high-temperature, high-pressure gas melting the shield 60.

The metal shield 60 may be welded and fixed to the lid 14, the conductive member 41, 51, or other members. In this configuration, a heat-resistant coating is preferably applied to the welded section.

The tabs 35 of the negative electrodes 31 may project from one of the end faces of the electrode assembly 12 that is different from the tab-side end face 12b, which faces the inner surface 14a of the lid 14 including the pressure release valve 18. In this case, the negative electrode tab group 36 is also at the end face different from the tab-side end face 12b, and the negative electrode conductive member 51 is curved from the end face from which the tabs 35 project to the tab-side end face 12b, from which the positive electrode tabs 25 project. In this configuration, the positive electrode conductive member 41, the shield 60, and a part of the negative electrode conductive member 51 connected to the tab-side end face 12b form the covering portion 55.

The tabs 25 of the positive electrodes 21 and the tabs 35 of the negative electrodes 31 may project from one of the end faces of the electrode assembly 12 that is different from the tab-side end face 12b, which faces the inner surface 14a of the lid 14 including the pressure release valve 18. In this configuration, the positive electrode tab group 26 and the negative electrode tab group 36 are located at the end face different from the tab-side end face 12b, and the positive and negative electrode conductive members 41 and 51 are also located at the end face different from the tab-side end face 12b.

In this configuration, the shield 60 is enlarged to cover the entire tab-side end face 12b and is placed on the tab-side end face 12b. The covering portion 55, which covers the cross section Ra of the three-dimensional region R, is formed by the shield 60 alone.

In the shield 60, the first rib 62 may extend from only one of the long edges of the shielding portion 61.

Further, the shield 60 does not have to include a second rib 63 or a first rib 62.

Figure 30:
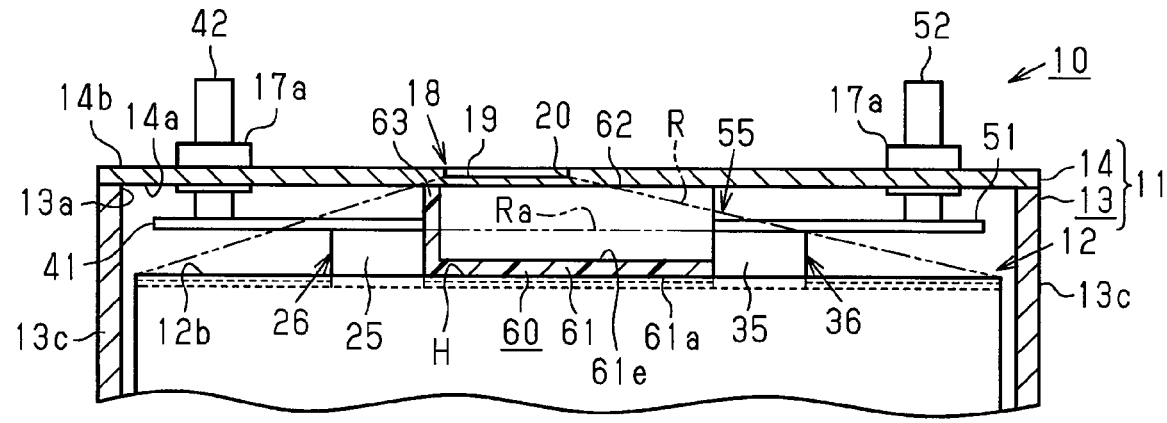
FIG. 30 is a partial cross-sectional view showing a shield including a second rib in contact with the inner surface of the lid.

In some embodiments and modes, as shown in FIG. 30, the projecting end of the second rib 63 extending from the shielding portion 61 may be in contact with the inner surface 14a of the lid 14. In this configuration, even when the gas pressure in a nail penetration test moves the shield 60 in the longitudinal direction of the tab-side end face 12b and the lid 14, the contact between the second rib 63 and the lid 14 allows the gas moving toward the pressure release valve 18 along the positive electrode conductive member 41 after colliding against the covering portion 55 to collide against the second rib 63. This allows fragments of the electrodes 21 and 31 and the metal foil 21a and 31a to fall from the gas.

Figure 31:
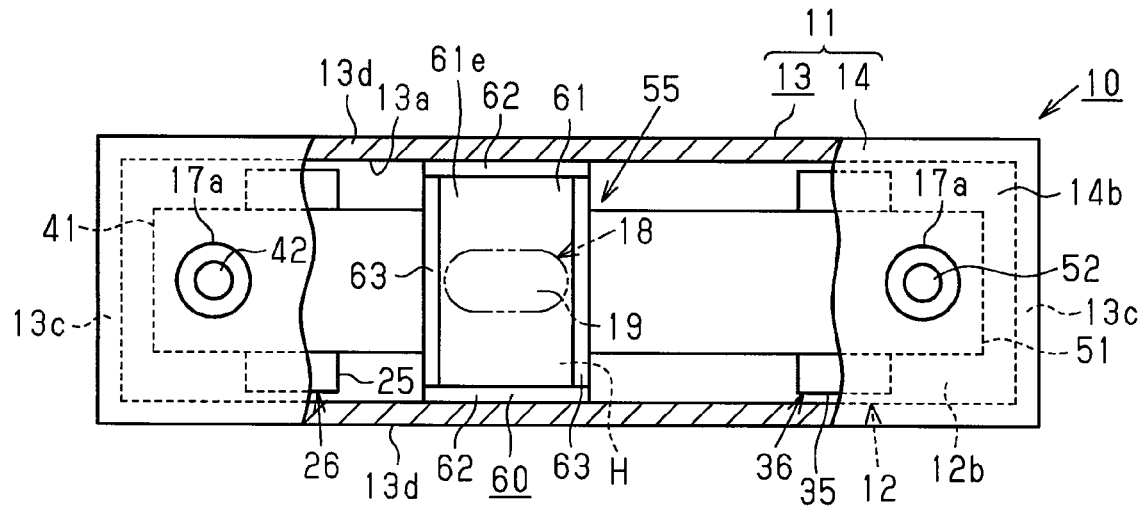
FIG. 31 is a plan view showing a rechargeable battery of a modification.
Figure 32:
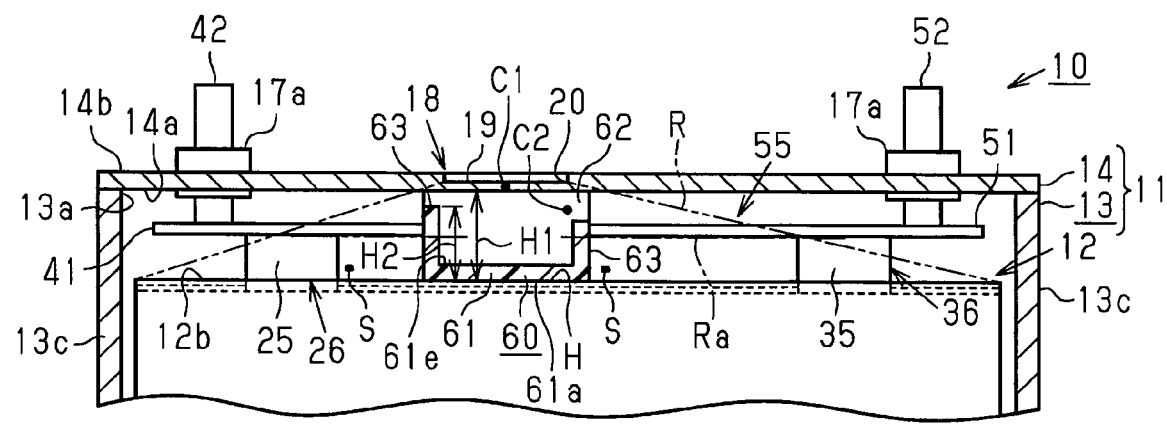
FIG. 32 is a partial cross-sectional view showing a rechargeable battery of a modification.

In some embodiments and modes, as shown in FIG. 31 or 32, the dimension of the shield 60 in the longitudinal direction of the lid 14 may be the same or slightly larger than the dimension of the pressure release valve 18 in the longitudinal direction of the lid 14. The dimension of the positive electrode conductive member 41 and the negative electrode conductive member 51 in the transverse direction is less than the distance between the opposing surfaces of the pair of long side walls 13d, that is, the opening width of the case main body 13 in the transverse direction of the lid 14.

The covered region H surrounded by the positive electrode conductive member 41, the negative electrode conductive member 51, and the pair of long side walls 13d is smaller than that of the embodiment described above. The shield 60 covers the covered region H. The center position C1 of the pressure release valve 18 is at the different position from the center position C2 between the tabs 25 of the positive electrodes 21 (the tab group 26) and the tabs 35 of the negative electrodes 31 (the tab group 36).

The shield 60 includes second ribs 63 at the two long edges of the shielding portion 61. The positive and negative electrode conductive members 41 and 51 are closer to the respective ends than the pressure release valve 18 in the longitudinal direction of the tab-side end face 12b and the lid 14, so that the conductive members 41 and 51 do not cover the pressure release valve 18 from the side corresponding to the electrode assembly 12. On the other hand, as viewed from the side corresponding to the outer surface 14b of the lid 14, the positive and negative electrode conductive members 41 and 51 cover large sections of the tab-side end face 12b at the longitudinal ends. As viewed from the side corresponding to the outer surface 14b of the lid 14, the positive and negative electrode conductive members 41 and 51 cover the central section of the tab-side end face 12b in the transverse direction of the lid 14 but not the end sections in the transverse direction.

The positive electrode tab group 26 and the negative electrode tab group 36 are located closer to the respective ends in the longitudinal direction of the lid 14 than the embodiment described above. A gap S is formed between a side surface of the positive electrode tab group 26 and the side surface of the second rib 63 facing the tab group 26. Likewise, a gap S is formed between a side surface of the negative electrode tab group 36 and the side surface of the second rib 63 facing the tab group 36 in the longitudinal direction of the lid 14. The distal end of the positive electrode conductive member 41 is placed so as to cover the corresponding gap S from the side corresponding to the lid 14, and the positive electrode conductive member 41 serves as a gas collision member. Likewise, the distal end of the negative electrode conductive member 51 is placed so as to cover the corresponding gap S from the side corresponding to the lid 14, and the negative electrode conductive member 51 serves as a gas collision member. The distal ends of the positive and negative conductive members 41 and 51 cover only the central areas of the gaps S in the transverse direction of the lid 14.

The distal end of the positive electrode conductive member 41 is in contact with or adjacent to the corresponding second rib 63, and the distal end of the negative electrode conductive member 51 is in contact with or adjacent to the corresponding second rib 63. The second ribs 63 thus function as movement restriction members that restrict movement of the shield 60 in the longitudinal direction of the lid 14.

The positive electrode conductive member 41, the shield 60, and the negative electrode conductive member 51 cover the cross section of the three-dimensional region R extending along the tab-side end face 12b over the entire length in the longitudinal direction of the cross section. Thus, the positive electrode conductive member 41, the shield 60, and the negative electrode conductive member 51 function as the covering portion 55.

The covering portion 55 covers the cross section of the three-dimensional region R extending along the tab-side end face 12b over the entire length in the longitudinal direction of the cross section by the lower surfaces of the positive electrode conductive member 41, the shield 60, and the negative electrode conductive member 51, which are parallel to the tab-side end face 12b and are not located in the same plane. However, as long as the covering portion 55 covers the cross section of the three-dimensional region R extending along the tab-side end face 12b over the entire length in the longitudinal direction of the cross section, the lower surfaces of the positive electrode conductive member 41, the shield 60, and the negative electrode conductive member 51 forming the covering portion 55 may be located at the same height and located in the same plane.

The positive electrode conductive member 41, the shield 60, and the negative electrode conductive member 51 do not have to cover one or both ends of the cross section Ra of the three-dimensional region R in the transverse direction of the lid 14. It is sufficient that the covering portion 55 covers at least the central section of the cross section Ra of the three-dimensional region R in the transverse direction of the lid 14, in particular, the section facing the pressure release valve 18.

In this configuration, gas generated in a nail penetration test emerges from the electrode assembly 12 through the tab-side end face 12b and moves toward the torn pressure release valve 18. Gas emerging from the tab-side end face 12b and moving linearly toward the pressure release valve 18 in the longitudinal direction of the lid 14 collides against the positive electrode conductive member 41, the shield 60, or the negative electrode conductive member 51. This shifts the direction of the flowing gas from the straight path to the pressure release valve 18 and creates longer gas discharge paths to the pressure release valve 18.

Gas also flows in the transverse direction of the lid 14 after colliding against the positive electrode conductive member 41, the shield 60, or the negative electrode conductive member 51. The gas moving toward the pressure release valve 18 is also deviated from the straight path to the pressure release valve 18, creating longer gas discharge paths to the pressure release valve 18. This allows fragments of the electrodes 21 and 31 and the metal foil 21a and 31a contained in the gas to fall in the case 11, reducing the fragments of the electrodes 21 and 31 and the metal foil 21a and 31a flying out of the case 11 together with the gas and becoming sparks.

The plastic shield 60 does not have to be placed on the tab-side end face 12b and may be bonded to the inner surface 14a of the lid 14 or other members by adhesion or welding, for example.

The separators 24 do not have to be of the type that are each placed between a positive electrode 21 and a negative electrode 31. The separator 24 may be a bag-shaped separator housing a positive electrode 21.

Alternatively, an elongated separator may be fanfolded and placed between the positive electrodes 21 and the negative electrodes 31.

The power storage apparatus may be other power storage apparatus such as an electric double-layer capacitor.

In the embodiments and modes, the rechargeable battery 10 is a lithium-ion rechargeable battery. However, the present disclosure is not limited to this, and other rechargeable battery such as a nickel-hydrogen battery may be used. Any rechargeable battery may be used that allows ions to move between the positive active material layer and the negative active material layer and transfer and receive electric charges.

DESCRIPTION OF THE REFERENCE NUMERALS

M . . . Central Axis; R . . . Three-Dimensional Region; Ra . . . Cross Section; 10 . . . Rechargeable Battery as Power Storage Apparatus; 11 . . . Case; 12 . . . Electrode Assembly; 12b . . . Tab-Side End Face as End Face; 14 . . . Lid as Wall Portion; 14a . . . Inner Surface; 14b . . . Outer Surface; 18 . . . Pressure Release Valve; 21 . . . Positive Electrode as Electrode; 25, 35 . . . Tab; 26 . . . Tab Group Functioning as Movement Restriction Member; 31 . . . Negative Electrode as Electrode; 36 . . . Tab Group Functioning as Movement Restriction Member; 41 . . . Positive Electrode Conductive Member Functioning as Movement Restriction Member And Forming Covering Portion; 51 . . . Negative Electrode Conductive Member Functioning as Movement Restriction Member And Forming Covering Portion; 51a . . . Overlapping Section; 5 lb . . . Bent Section; 55 . . . Covering Portion; 60, 66 . . . Shield; 61 . . . Shielding Portion; 62 . . . First Rib as Rib Forming Spacing Portion; 63 . . . Second Rib; 63a . . . Gas Passage Hole; 64 . . . Spacing Rod; 65 . . . Baffle Plate; 66a . . . Gas Inlet; 66b . . . Gas Outlet; 66c . . . Path Changing Wall; 74 . . . Reinforcing Rib

The invention claimed is:

1. A power storage apparatus comprising:
an electrode assembly in which a positive electrode and a negative electrode are insulated from each other and have a lamination structure;
a positive electrode conductive member connected to a tab of the positive electrode;
a negative electrode conductive member connected to a tab of the negative electrode;
liquid electrolyte;
a case containing the electrode assembly and the liquid electrolyte; and
a pressure release valve that is located in a wall portion of the case and configured to tear when a pressure in the case reaches a release pressure to release the pressure out of the case, wherein
the positive electrode conductive member and the negative electrode conductive member are arranged in a longitudinal direction of the wall portion,
the case has a parallelepiped shape and includes a base wall, which is opposite to the wall portion, two short side walls, which project from short edges of the base wall, and two long side walls, which project from long edges of the base wall,
the electrode assembly has a lamination direction in which the positive electrode and the negative electrode are stacked, the lamination direction is identical with a transverse direction of the wall portion, the positive electrode conductive member and the negative electrode conductive member have dimensions in the transverse direction of the wall portion that are less than a distance between opposing surfaces of the two long side walls, a region surrounded by planes connecting an outline of an end face of the electrode assembly that faces an inner surface of the wall portion of the case to an outline of the pressure release valve in shortest distances is defined as a three-dimensional region, the power storage apparatus further comprises a covering portion that is located in a space between the end face of the electrode assembly and the inner surface of the wall portion, the covering portion covering a cross section of the three-dimensional region that extends along the end face of the electrode assembly over an entire length in the longitudinal direction of the cross section, the positive electrode conductive member, the negative electrode conductive member, and a shield, which is placed between the positive and negative electrode conductive members, form the covering portion, the shield includes a shielding portion placed along the end face of the electrode assembly, and a spacing portion configured to be in contact with a section of the inner surface of the wall portion around the pressure release valve such that the shielding portion is spaced apart from the wall portion, the spacing portion includes a plurality of spacing rods projecting from the shielding portion.

2. The power storage apparatus according to claim 1, wherein the shield includes baffle plates each of which overlaps with a corresponding one of the tabs of different polarities as viewed from a side corresponding to an outer surface of the wall portion and covers the tab along the longitudinal direction of the wall portion.

3. The power storage apparatus according to claim 1, wherein a center position of the pressure release valve in the longitudinal direction of the wall portion is closer to the negative electrode conductive member than a center position between the tab of the positive electrode and the tab of the negative electrode in the longitudinal direction of the wall portion.

4. The power storage apparatus according to claim 1, wherein the shield is made of metal.

5. The power storage apparatus according to claim 1, wherein the shield has heat resistance.

6. The power storage apparatus according to claim 1, wherein the shield has a flat inner surface.

7. The power storage apparatus according to claim 1, wherein the shield extends from the wall portion.

8. A power storage apparatus comprising:
an electrode assembly in which a positive electrode and a negative electrode are insulated from each other and have a lamination structure;
a positive electrode conductive member connected to a tab of the positive electrode;
a negative electrode conductive member connected to a tab of the negative electrode;
liquid electrolyte;
a case containing the electrode assembly and the liquid electrolyte; and a pressure release valve that is located in a wall portion of the case and configured to tear when a pressure in the case reaches a release pressure to release the pressure out of the case, wherein the positive electrode conductive member and the negative electrode conductive member are arranged in a longitudinal direction of the wall portion, the case has a parallelepiped shape and includes a base wall, which is opposite to the wall portion, two short side walls, which project from short edges of the base wall, and two long side walls, which project from long edges of the base wall, the electrode assembly has a lamination direction in which the positive electrode and the negative electrode are stacked, the lamination direction is identical with a transverse direction of the wall portion, the positive electrode conductive member and the negative electrode conductive member have dimensions in the transverse direction of the wall portion that are less than a distance between opposing surfaces of the two long side walls, a region surrounded by planes connecting an outline of an end face of the electrode assembly that faces an inner surface of the wall portion of the case to an outline of the pressure release valve in shortest distances is defined as a three-dimensional region, the power storage apparatus further comprises a covering portion that is located in a space between the end face of the electrode assembly and the inner surface of the wall portion, the covering portion covering a cross section of the three-dimensional region that extends along the end face of the electrode assembly over an entire length in the longitudinal direction of the cross section, the positive electrode conductive member, the negative electrode conductive member, and a shield, which is placed between the positive and negative electrode conductive members, form the covering portion, the shield is placed on the end face of the electrode assembly.

9. The power storage apparatus according to claim 8, wherein the shield includes a shielding portion placed along the end face of the electrode assembly, and a spacing portion configured to be in contact with a section of the inner surface of the wall portion around the pressure release valve such that the shielding portion is spaced apart from the wall portion.

10. The power storage apparatus according to claim 9, wherein the spacing portion is a first rib that projects from the shielding portion toward the wall portion and has a surface intersecting with a gas path extending along a surface direction of the shielding portion.

11. The power storage apparatus according to claim 10, wherein the first rib is one of ribs projecting from a pair of edges of the shielding portion extending in the longitudinal direction of the wall portion.

12. The power storage apparatus according to claim 10, wherein the shield further includes a second rib projecting toward the wall portion from an edge of the shielding portion extending in the transverse direction of the wall portion.

13. The power storage apparatus according to claim 12, wherein the second rib includes a gas passage hole.

14. The power storage apparatus according to claim 12, wherein the second rib of the shield is located between the pressure release valve and the positive electrode conductive member, a path of gas moving from a side corresponding to the positive electrode conductive member toward the pressure release valve along the longitudinal direction and the surface direction of the wall portion is defined as a positive electrode-side gas discharge path, a path of gas moving from a side corresponding to the negative electrode conductive member toward the pressure release valve along the longitudinal direction and the surface direction of the wall portion is defined as a negative electrode-side gas discharge path, and a flow passage resistance on the gas in the positive electrode-side gas discharge path is greater than a flow passage resistance on the gas in the negative electrode-side gas discharge path.

15. The power storage apparatus according to claim 14, wherein the positive electrode-side gas discharge path has a smaller flow passage cross-sectional area than the negative electrode-side gas discharge path.

16. The power storage apparatus according to claim 14, wherein the second rib extending in the transverse direction of the wall portion has a projecting end extending from the shielding portion, and the projecting end is closer to the wall portion than the positive electrode conductive member.

17. The power storage apparatus according to claim 16, wherein the projecting end, which extends from the shielding portion, of the second rib is spaced apart from the inner surface of the wall portion.

18. The power storage apparatus according to claim 12, further comprising:

a gap between the second tab of the positive electrode and the rib in the longitudinal direction of the wall portion; and a gas collision member that covers the gap from a side corresponding to the wall portion.

19. The power storage apparatus according to claim 10, further comprising a reinforcing rib connected to the shielding portion and the first rib.

20. The power storage apparatus according to claim 10, wherein, when the shield is viewed from a side corresponding to the electrode assembly toward the inner surface of the wall portion, the first rib is within a plane defined by an outline of the shielding portion.

21. A power storage apparatus comprising:

an electrode assembly in which a positive electrode and a negative electrode are insulated from each other and have a lamination structure;

a positive electrode conductive member connected to a tab of the positive electrode;

a negative electrode conductive member connected to a tab of the negative electrode;

liquid electrolyte;

a case containing the electrode assembly and the liquid electrolyte; and a pressure release valve that is located in a wall portion of the case and configured to tear when a pressure in the case reaches a release pressure to release the pressure out of the case, wherein the positive electrode conductive member and the negative electrode conductive member are arranged in a longitudinal direction of the wall portion, the case has a parallelepiped shape and includes a base wall, which is opposite to the wall portion, two short side walls, which project from short edges of the base wall, and two long side walls, which project from long edges of the base wall, the electrode assembly has a lamination direction in which the positive electrode and the negative electrode are stacked, the lamination direction is identical with a transverse direction of the wall portion, the positive electrode conductive member and the negative electrode conductive member have dimensions in the transverse direction of the wall portion that are less than a distance between opposing surfaces of the two long side walls, a region surrounded by planes connecting an outline of an end face of the electrode assembly that faces an inner surface of the wall portion of the case to an outline of the pressure release valve in shortest distances is defined as a three-dimensional region, the power storage apparatus further comprises a covering portion that is located in a space between the end face of the electrode assembly and the inner surface of the wall portion, the covering portion covering a cross section of the three-dimensional region that extends along the end face of the electrode assembly over an entire length in the longitudinal direction of the cross section, the positive electrode conductive member, the negative electrode conductive member, and a shield, which is placed between the positive and negative electrode conductive members, form the covering portion, the shield has a tubular shape and a central axis extending in the longitudinal direction of the wall portion, the shield includes a gas inlet, which is located at an opening in one of axial ends of the shield, and a gas outlet, which is located in the other axial end and opens toward the pressure release valve, and the shield includes a path changing wall located in a gas path extending from the gas inlet to the gas outlet.

22. A power storage apparatus comprising:

an electrode assembly in which a positive electrode and a negative electrode are insulated from each other and have a lamination structure;

a positive electrode conductive member connected to a tab of the positive electrode;

a negative electrode conductive member connected to a tab of the negative electrode;

liquid electrolyte;

a case containing the electrode assembly and the liquid electrolyte; and a pressure release valve that is located in a wall portion of the case and configured to tear when a pressure in the case reaches a release pressure to release the pressure out of the case, wherein the positive electrode conductive member and the negative electrode conductive member are arranged in a longitudinal direction of the wall portion, the case has a parallelepiped shape and includes a base wall, which is opposite to the wall portion, two short side walls, which project from short edges of the base wall, and two long side walls, which project from long edges of the base wall, the electrode assembly has a lamination direction in which the positive electrode and the negative electrode are stacked, the lamination direction is identical with a transverse direction of the wall portion, the positive electrode conductive member and the negative electrode conductive member have dimensions in the transverse direction of the wall portion that are less than a distance between opposing surfaces of the two long side walls, a region surrounded by planes connecting an outline of an end face of the electrode assembly that faces an inner surface of the wall portion of the case to an outline of the pressure release valve in shortest distances is defined as a three-dimensional region, the power storage apparatus further comprises a covering portion that is located in a space between the end face of the electrode assembly and the inner surface of the wall portion, the covering portion covering a cross section of the three-dimensional region that extends along the end face of the electrode assembly over an entire length in the longitudinal direction of the cross section, the positive electrode conductive member, the negative electrode conductive member, and a shield, which is placed between the positive and negative electrode conductive members, form the covering portion, the power storage apparatus further comprises a movement restriction member that is located between the inner surface of the wall portion and the end face of the electrode assembly to restrict movement of the shield in the longitudinal direction of the wall portion.

23. The power storage apparatus according to claim 22, wherein
the negative electrode is one of negative electrodes each including the tab,
the movement restriction member includes
a first movement restriction member that restricts movement of the shield toward the positive electrode conductive member, the first movement restriction member being the positive electrode conductive member, and
a second movement restriction member that restricts movement of the shield toward the negative electrode conductive member, the second movement restriction member being a tab group that is the tabs of the negative electrodes collected in the lamination direction.

24. The power storage apparatus according to claim 22, wherein
the movement restriction member includes
a first movement restriction member that restricts movement of the shield toward the positive electrode conductive member, the first movement restriction member being the positive electrode conductive member, and
a second movement restriction member that restricts movement of the shield toward the negative electrode conductive member, the second movement restriction member being the negative electrode conductive member.

25. A power storage apparatus comprising:
an electrode assembly in which a positive electrode and a negative electrode are insulated from each other and have a lamination structure;
a positive electrode conductive member connected to a tab of the positive electrode;
a negative electrode conductive member connected to a tab of the negative electrode;
liquid electrolyte;
a case containing the electrode assembly and the liquid electrolyte; and
a pressure release valve that is located in a wall portion of the case and configured to tear when a pressure in the case reaches a release pressure to release the pressure out of the case, wherein the positive electrode conductive member and the negative electrode conductive member are arranged in a longitudinal direction of the wall portion, the case has a parallelepiped shape and includes a base wall, which is opposite to the wall portion, two short side walls, which project from short edges of the base wall, and two long side walls, which project from long edges of the base wall, the electrode assembly has a lamination direction in which the positive electrode and the negative electrode are stacked, the lamination direction is identical with a transverse direction of the wall portion, the positive electrode conductive member and the negative electrode conductive member have dimensions in the transverse direction of the wall portion that are less than a distance between opposing surfaces of the two long side walls, a region surrounded by planes connecting an outline of an end face of the electrode assembly that faces an inner surface of the wall portion of the case to an outline of the pressure release valve in shortest distances is defined as a three-dimensional region, the power storage apparatus further comprises a covering portion that is located in a space between the end face of the electrode assembly and the inner surface of the wall portion, the covering portion covering a cross section of the three-dimensional region that extends along the end face of the electrode assembly over an entire length in the longitudinal direction of the cross section, the positive electrode conductive member, the negative electrode conductive member, and a shield, which is placed between the positive and negative electrode conductive members, form the covering portion, the shield includes
a shielding portion placed along the end face of the electrode assembly, and
a spacing portion configured to be in contact with a section of the inner surface of the wall portion around the pressure release valve such that the shielding portion is spaced apart from the wall portion, one of the positive electrode conductive member and the negative electrode conductive member includes an overlapping section that overlaps with the wall portion and the shielding portion as viewed from a side corresponding to an outer surface of the wall portion, the power storage apparatus further comprises a bent section where the overlapping section of the one of the positive and negative electrode conductive members is bent toward the pressure release valve.

26. A power storage apparatus comprising:
an electrode assembly in which a positive electrode and a negative electrode are insulated from each other and have a lamination structure;
a positive electrode conductive member connected to a tab of the positive electrode;
a negative electrode conductive member connected to a tab of the negative electrode;
liquid electrolyte;
a case containing the electrode assembly and the liquid electrolyte; and
a pressure release valve that is located in a wall portion of the case and configured to tear when a pressure in the case reaches a release pressure to release the pressure out of the case, wherein the positive electrode conductive member and the negative electrode conductive member are arranged in a longitudinal direction of the wall portion, the case has a parallelepiped shape and includes a base wall, which is opposite to the wall portion, two short side walls, which project from short edges of the base wall, and two long side walls, which project from long edges of the base wall, the electrode assembly has a lamination direction in which the positive electrode and the negative electrode are stacked, the lamination direction is identical with a transverse direction of the wall portion, the positive electrode conductive member and the negative electrode conductive member have dimensions in the transverse direction of the wall portion that are less than a distance between opposing surfaces of the two long side walls, a region surrounded by planes connecting an outline of an end face of the electrode assembly that faces an inner surface of the wall portion of the case to an outline of the pressure release valve in shortest distances is defined as a three-dimensional region, the power storage apparatus further comprises a covering portion that is located in a space between the end face of the electrode assembly and the inner surface of the wall portion, the covering portion covering a cross section of the three-dimensional region that extends along the end face of the electrode assembly over an entire length in the longitudinal direction of the cross section, the positive electrode conductive member, the negative electrode conductive member, and a shield, which is placed between the positive and negative electrode conductive members, form the covering portion, the shield is spaced apart from an inner surface of the case.

* * * * *